(12) United States Patent
Van Baelen et al.

(10) Patent No.: US 10,606,009 B2
(45) Date of Patent: Mar. 31, 2020

(54) CABLE DISTRIBUTION SYSTEM WITH FAN OUT DEVICES

(71) Applicant: CommScope Connectivity Belgium BVBA, Kessel-Lo (BE)

(72) Inventors: David Jan Irma Van Baelen, Winksele (BE); Eric Schurmans, Geetbets (BE); Jiri Zavrel, Leuven (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 15/365,207

(22) Filed: Nov. 30, 2016

(65) Prior Publication Data

US 2017/0153407 A1    Jun. 1, 2017

Related U.S. Application Data

(60) Provisional application No. 62/261,606, filed on Dec. 1, 2015.

(51) Int. Cl.
*G02B 6/44* (2006.01)
*G02B 6/38* (2006.01)
*H04Q 1/06* (2006.01)

(52) U.S. Cl.
CPC ......... *G02B 6/4452* (2013.01); *G02B 6/3897* (2013.01); *G02B 6/445* (2013.01);
(Continued)

(58) Field of Classification Search
CPC .. G02B 6/3897; G02B 6/4452; G02B 6/4471; G02B 6/4457; G02B 6/445;
(Continued)

(56) References Cited

U.S. PATENT DOCUMENTS 4,650,933 A  3/1987 Benda et al.
4,768,961 A  9/1988 Lau
(Continued)

FOREIGN PATENT DOCUMENTS

AU   2008264211 A1   1/2009
CN     203101690 U   7/2013
(Continued)

OTHER PUBLICATIONS

International Search Report and Written Opinion for Application No. PCT/EP2016/079513 dated Mar. 3, 2017.
(Continued)

*Primary Examiner* — Thomas A Hollweg
*Assistant Examiner* — Mary A El-Shammaa
(74) *Attorney, Agent, or Firm* — Merchant & Gould P.C.

(57) ABSTRACT

A cable distribution system is provided wherein a feeder cable with one or more feeder fibers is received by a distribution terminal, device, or box. The feeder fibers are spliced to a feeder fan out device. Customers can directly connect to the feeder fan out device by patching between the feeder fan out device and a distribution fan out device that is spliced to a distribution cable. This connection creates a point-to-point connection. Alternatively, a splitter input can be connected to the feeder fan out device wherein the splitter splits the signal as desired into a plurality of outputs. The outputs of the splitters can be in the form of connectors or adapters. The connectors or adapters are then connected to the distribution fan out device, and customers can receive a split signal through the distribution cable that is spliced with the distribution fan out device.

21 Claims, 16 Drawing Sheets

(52) U.S. Cl.
CPC ......... *G02B 6/4455* (2013.01); *G02B 6/4457* (2013.01); *G02B 6/4472* (2013.01); *G02B 6/4473* (2013.01); *H04Q 1/06* (2013.01)

(58) Field of Classification Search
CPC .. G02B 6/4455; G02B 6/4472; G02B 6/4475; G02B 6/4473
See application file for complete search history.

(56) References Cited

U.S. PATENT DOCUMENTS

| | | | |
|---|---|---|---|
| 4,770,639 A | 9/1988 | Lau | |
| 4,797,114 A | 1/1989 | Lau | |
| 4,820,200 A | 4/1989 | Lau | |
| 4,840,568 A | 6/1989 | Burroughs et al. | |
| 5,189,410 A | 2/1993 | Kosugi et al. | |
| 5,199,878 A | 4/1993 | Dewey et al. | |
| 5,214,673 A | 5/1993 | Morgenstern et al. | |
| 5,317,663 A | 5/1994 | Beard et al. | |
| 5,339,379 A | 8/1994 | Kutsch et al. | |
| 5,363,465 A | 11/1994 | Korkowski et al. | |
| 5,393,249 A | 2/1995 | Morgenstern et al. | |
| 5,432,875 A | 7/1995 | Korkowski et al. | |
| 5,467,062 A | 11/1995 | Burroughs | |
| 5,497,444 A | 3/1996 | Wheeler | |
| 5,582,525 A | 12/1996 | Louwagie et al. | |
| 5,613,030 A | 3/1997 | Hoffer et al. | |
| 5,627,925 A | 5/1997 | Alferness et al. | |
| 5,685,741 A | 11/1997 | Dewey et al. | |
| 5,688,780 A | 11/1997 | Chong et al. | |
| 5,694,511 A | 12/1997 | Pimpinella et al. | |
| 5,701,380 A | 12/1997 | Larson et al. | |
| 5,717,810 A | 2/1998 | Wheeler | |
| 5,740,298 A | 4/1998 | Macken et al. | |
| 5,768,463 A | 6/1998 | Foss et al. | |
| 5,937,807 A | 8/1999 | Peters et al. | |
| 5,946,440 A | 8/1999 | Puetz | |
| 6,061,492 A | 5/2000 | Strause et al. | |
| 6,116,961 A | 9/2000 | Henneberger et al. | |
| 6,208,796 B1 | 3/2001 | Vigliaturo | |
| 6,226,111 B1 | 5/2001 | Chang et al. | |
| 6,263,136 B1 | 7/2001 | Jennings et al. | |
| 6,307,998 B2 | 10/2001 | Vigliaturo | |
| 6,328,608 B1 | 12/2001 | Olson et al. | |
| 6,363,183 B1 | 3/2002 | Koh | |
| 6,370,294 B1 | 4/2002 | Pfeiffer et al. | |
| 6,418,262 B1 | 7/2002 | Puetz et al. | |
| 6,424,781 B1 | 7/2002 | Puetz et al. | |
| 6,427,035 B1 | 7/2002 | Mahoney | |
| 6,507,691 B1 | 1/2003 | Hunsinger et al. | |
| 6,511,330 B1 | 1/2003 | Norris | |
| 6,532,332 B2 | 3/2003 | Solheid et al. | |
| 6,535,682 B1 | 3/2003 | Puetz et al. | |
| 6,554,652 B1 | 4/2003 | Musolf et al. | |
| 6,556,738 B2 | 4/2003 | Pfeiffer et al. | |
| 6,556,763 B1 | 4/2003 | Puetz et al. | |
| 6,579,014 B2 | 6/2003 | Melton et al. | |
| 6,597,014 B1 | 6/2003 | Melton et al. | |
| 6,591,051 B2 | 7/2003 | Solheid et al. | |
| 6,599,024 B2 | 7/2003 | Zimmel | |
| 6,614,953 B2 | 9/2003 | Strasser et al. | |
| 6,616,459 B2 | 9/2003 | Norris | |
| 6,632,106 B2 | 10/2003 | Musolf et al. | |
| RE38,311 E | 11/2003 | Wheeler | |
| 6,647,197 B1 | 11/2003 | Marrs et al. | |
| 6,668,108 B1 | 12/2003 | Helkey et al. | |
| 6,688,780 B2 | 2/2004 | Duran | |
| 6,719,382 B2 | 4/2004 | Sucharczuk et al. | |
| 6,760,531 B1 | 7/2004 | Solheid et al. | |
| 6,761,594 B2 | 7/2004 | Johnson et al. | |
| 6,792,191 B1 | 9/2004 | Clapp, Jr. et al. | |
| 6,810,193 B1 | 10/2004 | Mueller | |
| 6,822,874 B1 | 11/2004 | Marler | |
| 6,824,312 B2 | 11/2004 | McClellan et al. | |
| 6,830,465 B2 | 12/2004 | Norris et al. | |
| 6,832,035 B1 | 12/2004 | Daoud et al. | |
| 6,848,952 B2 | 2/2005 | Norris | |
| 6,850,685 B2 | 2/2005 | Tinucci et al. | |
| 6,863,446 B2 | 3/2005 | Ngo | |
| 6,885,798 B2 | 4/2005 | Zimmel | |
| 6,890,187 B2 | 5/2005 | Norris | |
| 6,937,807 B2 | 8/2005 | Franklin et al. | |
| 6,983,095 B2 | 1/2006 | Reagan et al. | |
| 7,029,322 B2 | 4/2006 | Ernst et al. | |
| 7,118,284 B2 | 10/2006 | Nakajima et al. | |
| 7,142,764 B2 | 11/2006 | Allen et al. | |
| 7,149,398 B2 | 12/2006 | Solheid et al. | |
| 7,190,874 B1 | 3/2007 | Barth et al. | |
| 7,194,181 B2 | 3/2007 | Holmberg et al. | |
| 7,218,827 B2 | 5/2007 | Vongseng et al. | |
| 7,218,828 B2 | 5/2007 | Feustel et al. | |
| 7,233,731 B2 | 6/2007 | Solheid et al. | |
| 7,303,220 B2 | 12/2007 | Zellak | |
| 7,310,474 B2 | 12/2007 | Kanasaki et al. | |
| 7,333,606 B1 | 2/2008 | Swam et al. | |
| 7,333,706 B2 | 2/2008 | Parikh et al. | |
| 7,346,254 B2 | 3/2008 | Kramer et al. | |
| 7,376,322 B2 | 5/2008 | Zimmel et al. | |
| 7,376,323 B2 | 5/2008 | Zimmel | |
| 7,400,813 B2 | 7/2008 | Zimmel | |
| 7,418,181 B2 | 8/2008 | Zimmel et al. | |
| 7,418,184 B1 | 8/2008 | Gonzales et al. | |
| 7,453,706 B2 | 11/2008 | Clark et al. | |
| 7,470,068 B2 | 12/2008 | Kahle et al. | |
| 7,495,931 B2 | 2/2009 | Clark et al. | |
| 7,509,016 B2 | 3/2009 | Smith et al. | |
| 7,536,075 B2 | 5/2009 | Zimmel | |
| 7,593,617 B2 | 9/2009 | Zimmel et al. | |
| 7,606,459 B2 | 10/2009 | Zimmel et al. | |
| 7,636,507 B2 | 12/2009 | Lu et al. | |
| 7,697,812 B2 | 4/2010 | Parikh et al. | |
| 7,706,656 B2 | 4/2010 | Zimmel | |
| 7,751,673 B2 | 7/2010 | Anderson et al. | |
| 7,760,984 B2 | 7/2010 | Solheid et al. | |
| 7,816,602 B2 | 10/2010 | Landry et al. | |
| 7,835,611 B2 | 11/2010 | Zimmel | |
| 7,853,112 B2 | 12/2010 | Zimmel et al. | |
| 7,885,505 B2 | 2/2011 | Zimmel | |
| 7,912,336 B2 | 3/2011 | Zimmel | |
| 8,019,191 B2 | 9/2011 | Laurisch | |
| 8,023,791 B2 | 9/2011 | Zimmel et al. | |
| 8,086,084 B2 | 12/2011 | Bran de Leon et al. | |
| 8,107,816 B2 | 1/2012 | Bolster et al. | |
| 8,121,457 B2 | 2/2012 | Zimmel et al. | |
| 8,180,192 B2 | 5/2012 | Zimmel | |
| 8,189,983 B2 | 5/2012 | Brunet et al. | |
| 8,297,708 B2 | 10/2012 | Mizobata et al. | |
| 8,331,753 B2 | 12/2012 | Zimmel et al. | |
| 8,340,491 B2 | 12/2012 | Zimmel | |
| 8,346,045 B2 | 1/2013 | Zimmel et al. | |
| 8,488,934 B2 | 7/2013 | Zhou et al. | |
| 8,494,329 B2 | 7/2013 | Nhep et al. | |
| 8,520,997 B2 | 8/2013 | Zimmel | |
| 8,542,972 B2 | 9/2013 | Zimmel | |
| 8,554,044 B2 | 10/2013 | Bran de Leon et al. | |
| 8,577,198 B2 | 11/2013 | Solheid et al. | |
| 8,634,689 B2 | 1/2014 | Zimmel | |
| 8,660,429 B2 | 2/2014 | Bolster et al. | |
| 8,705,928 B2 | 4/2014 | Zimmel et al. | |
| 8,774,585 B2 | 7/2014 | Kowalczyk et al. | |
| 8,798,428 B2 | 8/2014 | Zimmel et al. | |
| 8,929,708 B2 | 1/2015 | Pimentel et al. | |
| 9,146,371 B2 | 9/2015 | Zimmel | |
| 9,197,346 B2 | 11/2015 | Bolster et al. | |
| 9,213,159 B2 | 12/2015 | Zimmel et al. | |
| 9,239,442 B2 | 1/2016 | Zhang | |
| 9,274,285 B2 | 3/2016 | Courchaine et al. | |
| 9,335,504 B2 | 5/2016 | Solheid et al. | |
| 9,417,401 B2 | 8/2016 | Zhang | |
| 9,494,760 B2 | 11/2016 | Simmons et al. | |
| 9,563,017 B2 | 2/2017 | Zimmel et al. | |
| 9,678,292 B2 | 6/2017 | Landry et al. | |
| 10,031,305 B2 | 7/2018 | Leeman et al. | |
| 2004/0175090 A1 | 9/2004 | Vastmans et al. | |

(56) References Cited

U.S. PATENT DOCUMENTS

| | | |
|---|---|---|
| 2005/0053341 A1 | 3/2005 | Zimmel |
| 2005/0129379 A1 | 6/2005 | Reagan et al. |
| 2005/0232551 A1 | 10/2005 | Chang et al. |
| 2005/0232565 A1 | 10/2005 | Heggestad et al. |
| 2006/0008231 A1* | 1/2006 | Reagan .............. G02B 6/3849 385/135 |
| 2006/0228086 A1 | 10/2006 | Holmberg et al. |
| 2007/0036503 A1 | 2/2007 | Solheid et al. |
| 2007/0147765 A1 | 6/2007 | Gniadek et al. |
| 2007/0165995 A1* | 7/2007 | Reagan .............. G02B 6/4452 385/135 |
| 2007/0189691 A1* | 8/2007 | Barth .............. G02B 6/4452 385/135 |
| 2007/0189692 A1 | 8/2007 | Zimmel et al. |
| 2008/0031585 A1* | 2/2008 | Solheid .............. G02B 6/4452 385/135 |
| 2008/0079341 A1* | 4/2008 | Anderson .......... G02B 6/4452 312/287 |
| 2008/0124038 A1 | 5/2008 | Kowalczyk et al. |
| 2008/0170824 A1 | 7/2008 | Hendrickson |
| 2008/0175550 A1 | 7/2008 | Coburn et al. |
| 2009/0022468 A1 | 1/2009 | Zimmel |
| 2009/0060440 A1 | 3/2009 | Wright et al. |
| 2009/0067802 A1 | 3/2009 | Hoehne et al. |
| 2009/0103879 A1* | 4/2009 | Tang .................. G02B 6/4452 385/135 |
| 2009/0110359 A1 | 4/2009 | Smith et al. |
| 2009/0263097 A1* | 10/2009 | Solheid .............. G02B 6/4452 385/135 |
| 2009/0290842 A1 | 11/2009 | Bran de Leon et al. |
| 2009/0317047 A1* | 12/2009 | Smith .............. G02B 6/3897 385/135 |
| 2009/0324187 A1 | 12/2009 | Wakileh et al. |
| 2010/0129030 A1 | 5/2010 | Giraud et al. |
| 2010/0226654 A1* | 9/2010 | Smith .............. H04B 10/25754 398/116 |
| 2010/0322580 A1 | 12/2010 | Beamon et al. |
| 2010/0329623 A1 | 12/2010 | Smith et al. |
| 2010/0329624 A1 | 12/2010 | Zhou et al. |
| 2011/0026894 A1 | 2/2011 | Rudenick et al. |
| 2011/0058785 A1 | 3/2011 | Solheid et al. |
| 2011/0091170 A1 | 4/2011 | Bran de Leon et al. |
| 2011/0164853 A1 | 7/2011 | Corbille et al. |
| 2011/0211799 A1 | 9/2011 | Conner et al. |
| 2011/0262095 A1 | 10/2011 | Fabrykowski |
| 2011/0274403 A1* | 11/2011 | LeBlanc .............. G02B 6/4452 385/135 |
| 2011/0293235 A1 | 12/2011 | Nieves et al. |
| 2012/0027355 A1* | 2/2012 | LeBlanc .............. G02B 6/4471 385/54 |
| 2013/0114930 A1 | 5/2013 | Smith et al. |
| 2013/0114937 A1 | 5/2013 | Zimmel et al. |
| 2013/0170810 A1 | 7/2013 | Badar et al. |
| 2013/0243386 A1 | 9/2013 | Pimentel et al. |
| 2014/0219622 A1 | 8/2014 | Coan et al. |
| 2014/0334790 A1 | 11/2014 | Zhang |
| 2015/0110442 A1 | 4/2015 | Zimmel et al. |
| 2015/0137461 A1 | 5/2015 | Coenegracht et al. |
| 2015/0241654 A1 | 8/2015 | Allen et al. |
| 2015/0286023 A1 | 10/2015 | Van Baelen et al. |
| 2015/0301301 A1 | 10/2015 | Mullaney |
| 2015/0355428 A1 | 12/2015 | Leeman et al. |
| 2016/0370551 A1 | 12/2016 | Hill et al. |
| 2017/0097486 A1 | 4/2017 | Barrantes et al. |
| 2017/0123175 A1 | 5/2017 | Van Baelen et al. |
| 2019/0036316 A1 | 1/2019 | Van Baelen |
| 2019/0056559 A1 | 2/2019 | Leeman et al. |

FOREIGN PATENT DOCUMENTS

| | | |
|---|---|---|
| CN | 103238095 A | 8/2013 |
| DE | 4130706 A1 | 3/1993 |
| DE | 4229510 A1 | 3/1994 |
| DE | 20201170 U1 | 5/2002 |
| DE | 10350954 A1 | 5/2005 |
| DE | 102009008068 A1 | 8/2010 |
| EP | 0828356 A2 | 3/1998 |
| EP | 0730177 A2 | 9/1999 |
| EP | 1092996 A2 | 4/2001 |
| EP | 1107031 A1 | 6/2001 |
| EP | 1179745 A2 | 2/2002 |
| EP | 1473578 A2 | 11/2004 |
| EP | 1626300 A1 | 7/2005 |
| EP | 2434317 A1 | 3/2012 |
| GB | 2300978 A | 11/1996 |
| JP | 2007121398 A | 5/2007 |
| JP | 2010122597 A | 6/2010 |
| WO | 9636896 A1 | 11/1996 |
| WO | 007053 A2 | 2/2000 |
| WO | 0075706 A2 | 12/2000 |
| WO | 02099528 A1 | 12/2002 |
| WO | 02103429 A2 | 12/2002 |
| WO | 03093889 A1 | 11/2003 |
| WO | 2005045487 A2 | 5/2005 |
| WO | 2006127397 A1 | 11/2006 |
| WO | 2010040256 A1 | 4/2010 |
| WO | 2010134157 A1 | 11/2010 |
| WO | 2012074688 A2 | 6/2012 |
| WO | 2012112344 A1 | 8/2012 |
| WO | 2013117598 A1 | 8/2013 |
| WO | 2015193384 A2 | 12/2015 |
| WO | 2016066780 A1 | 5/2016 |

OTHER PUBLICATIONS

International Search Report and Written Opinion for Application No. PCT/EP2013/077292 dated May 28, 2014.

International Search Report and Written Opinion for Application No. PCT/EP2015/063620 dated Feb. 5, 2016.

International Search Report and Written Opinion of the International Searching Authority for International Patent Application No. PCT/EP2017/051908 dated Jul. 18, 2017, 19 pages.

ADC Telecommunications, Inc., "DSX-3 Digital Signal Cross-Connect (DSX3) System Application Guide," Document No. ADCP-80-323, 1st Edition, Issue 2, Dec. 1996, p. 1-10; p. 1-11.

ADC Telecommunications, Inc., "DSX-1 Digital Signal Cross Connect PIX-DSX-1—Fifth Edition," dated Oct. 1994, 36 Pages.

ADC Telecommunications, Inc., "DSX-3 Digital Signal Cross-Connect, Front and Rear Cross-Connect Products, 2nd Edition," Doc. No. 274, dated Oct. 2004, 65 pp.

ADC Telecommunications, Inc., "OmniReach FTTP Solutions," Doc. No. 1276550, dated May 2004, 13 pp.

ADC Telecommunications, Inc., "PxPlus™ DS1 Digital Signal Cross-Connect," dated Jan. 1997, 12 Pages.

AFL Global: "LGX Optical Coupler Modules," May 17, 2012, XP002744968, retrieved from the Internet: URL.https://web.archive.org/web/20120517022939/http://www.aflglobal.com/Products/Fiber-Inside-Plant/Couplers-Splitters/Optical-Coupler-Modules.aspx.

* cited by examiner

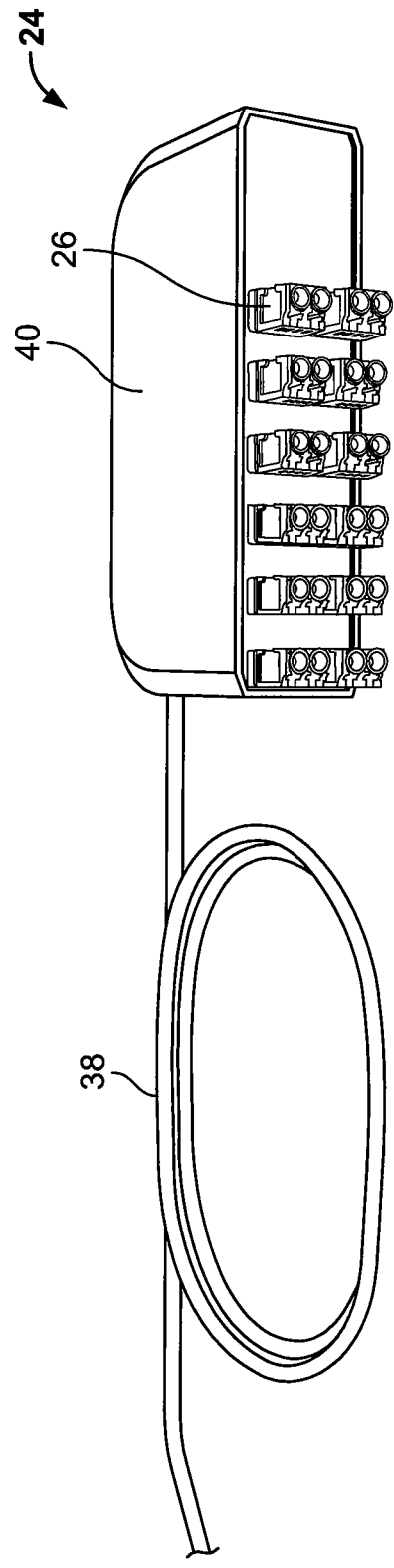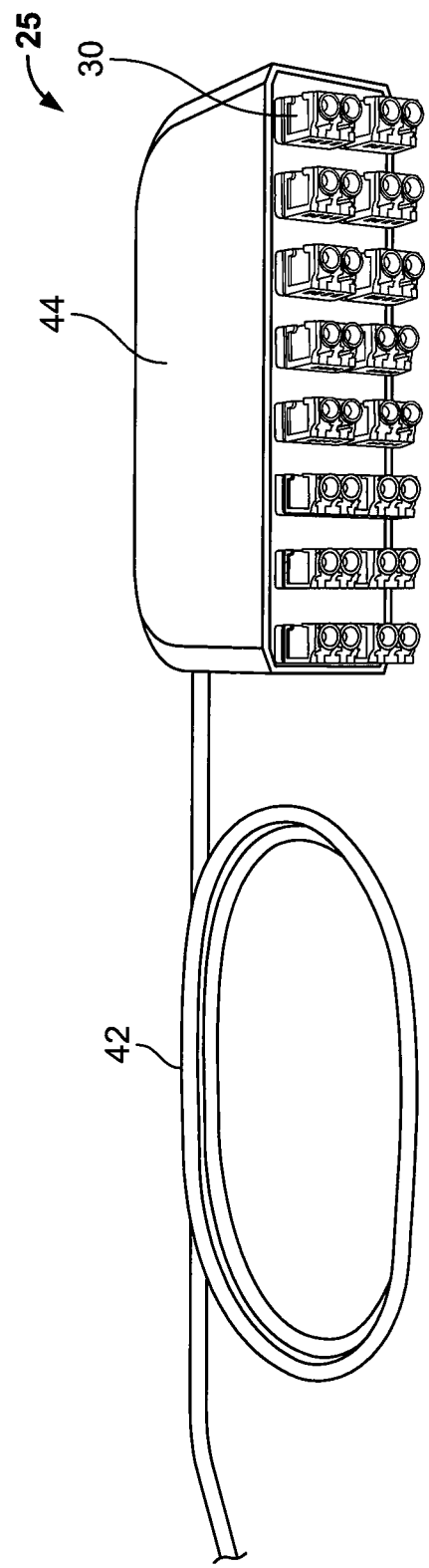

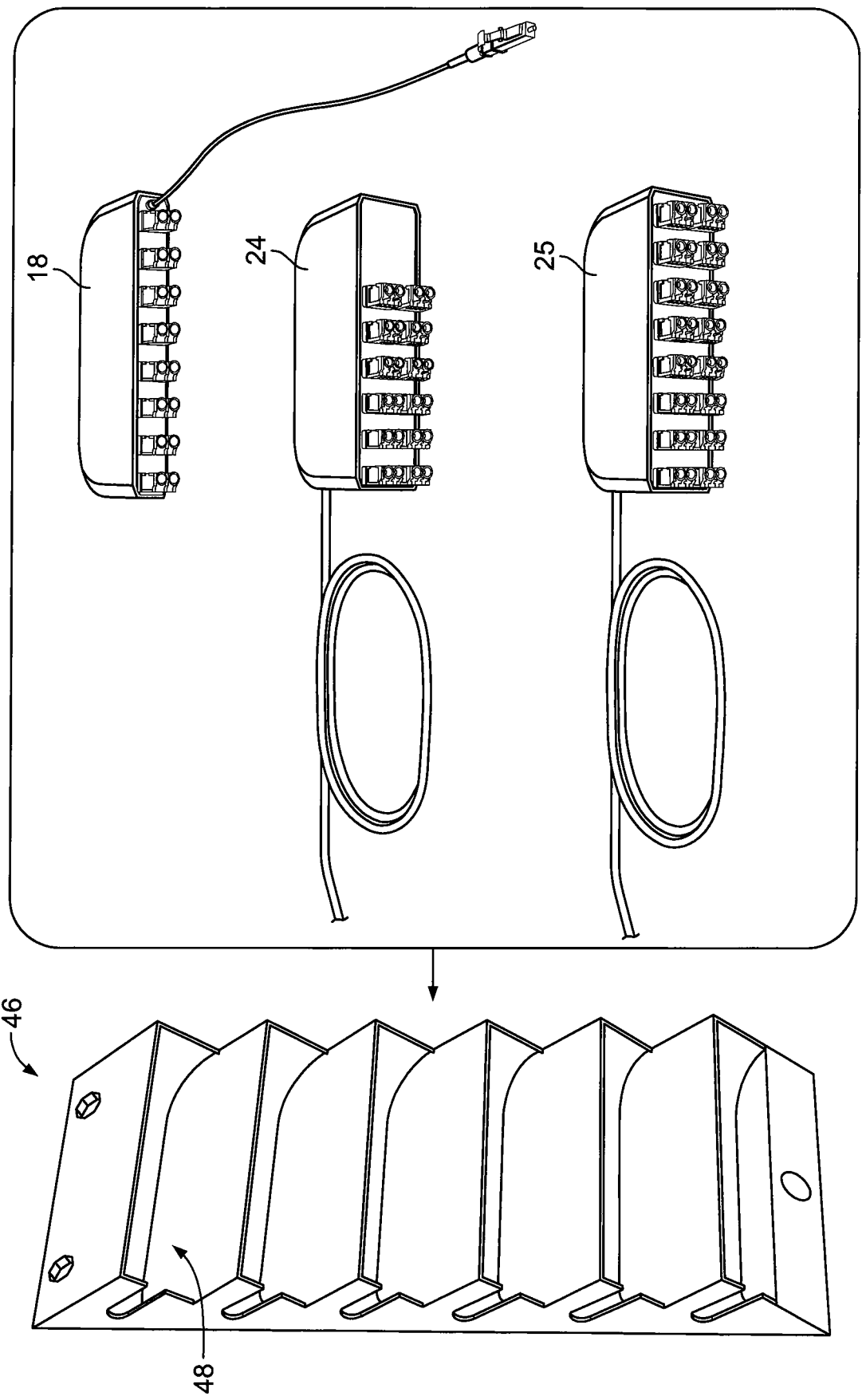

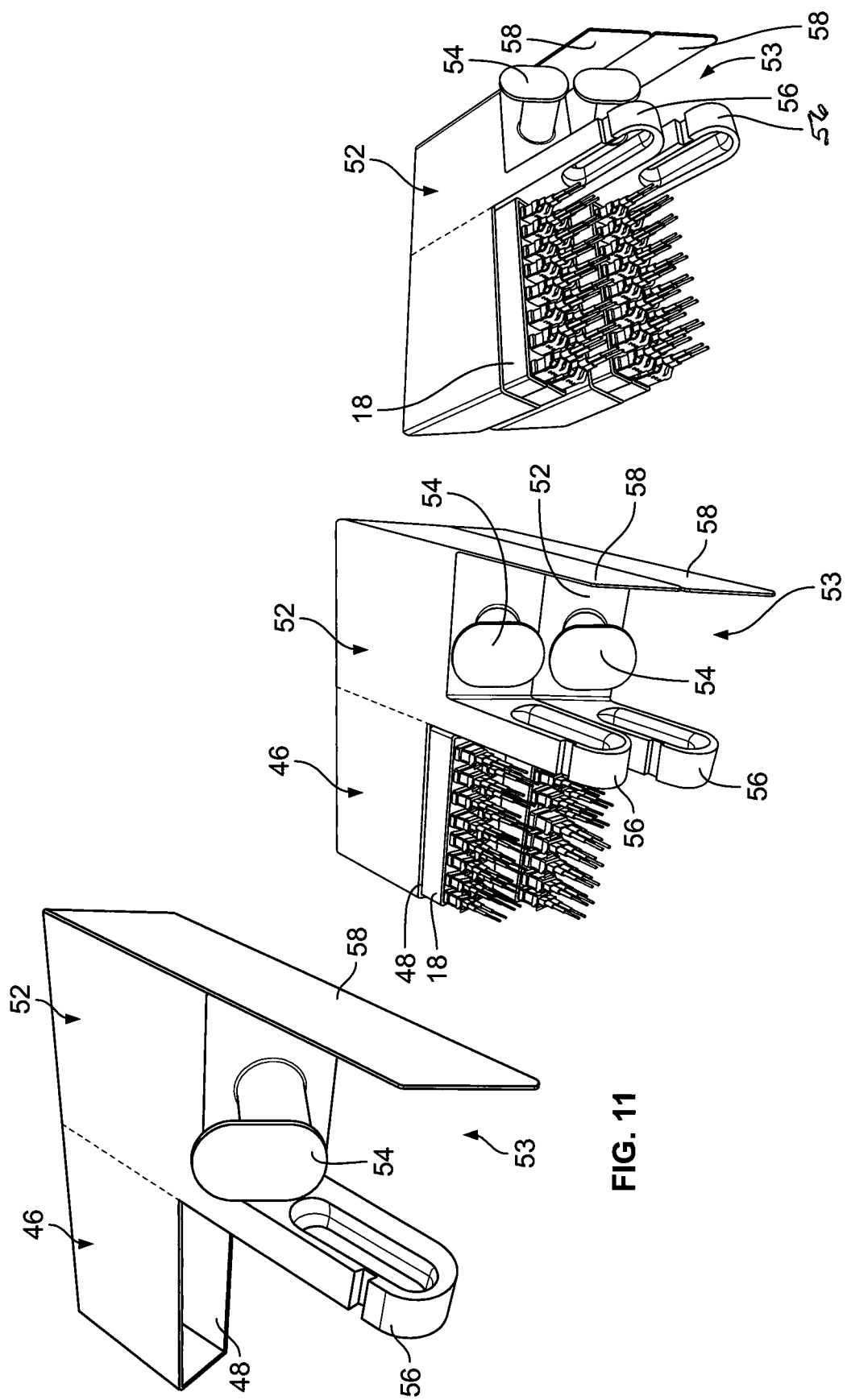

CABLE DISTRIBUTION SYSTEM WITH FAN OUT DEVICES

CROSS REFERENCE TO RELATED APPLICATION

This application claims the benefit of U.S. Provisional Patent Application Ser. No. 62/261,606, filed Dec. 1, 2015, which application is hereby incorporated by reference in its entirety.

BACKGROUND

As demand for telecommunications increases, fiber optic networks are being extended in more and more areas. In facilities such as multiple dwelling units (MDU's), apartments, condominiums, businesses, etc., fiber optic distribution terminals and boxes are used to provide subscriber access points to the fiber optic network. Cables are also used to interconnect the subscriber access points provided by the fiber distribution terminals with subscriber interface units (e.g., Optical Network Terminals) provided at subscriber locations (e.g., at each residence of an MDU). With respect to such fiber distribution systems, there is a need for techniques to effectively manage cables and optical splitters while also taking into consideration space constraints.

SUMMARY

A cable distribution system is provided wherein a feeder cable with one or more feeder fibers is received by a distribution terminal, device, or box. The feeder fibers are spliced to a feeder fan out device. Customers can directly connect to the feeder fan out device by patching between the feeder fan out device and a distribution fan out device that is spliced to a distribution cable. This connection creates a point-to-point connection. The number of fan out devices in the system can be increased as needed. Alternatively, a splitter input can be connected to the feeder fan out device, such as through a pigtail extending from the splitter, wherein the splitter splits the signal as desired into a plurality of outputs. The outputs of the splitters can be in the form of connectors or adapters. The connectors or adapters are then connected to the distribution fan out device and customers can receive a split signal through the distribution cable that is spliced with the distribution fan out device. The system allows for the use of un-connectorized distribution cables.

The cable distribution system allows for mixing of connection types to the customer(s) such as a direct connection (point-to-point), or a split signal connection. Further, the types of splitters can be mixed and varied as desired, such as 1×2, 1×4, 1×8, 1×16, 1×32, 2×4, etc., or other. Different combinations of splitters can be used in the distribution device, such as one or more 1×4 splitters, one or more 1×8 splitters, and/or one or more 1×16 splitters. Further the types of fan out devices can be mixed and varied as desired, such as fan out devices having 8, 16, 24, 32 outputs, etc., or other. Other combinations are possible.

The fan out devices and splitters can be stored in the system using a tower that is configured to receive a plurality of fan out devices or splitters. Adjacent the tower can be cable management modules that each include spools and together form a vertical trough that runs next to the tower.

The fan out devices and splitters can also be stored in a stacking arrangement. In such an arrangement, the fan out devices and splitters can be stacked on top of one another in an internal tray. The tray is then stacked on top of a base. The base is configured to hold a plurality of splice trays for splicing a feeder cable.

The fan out devices and splitters can also be stored in another stacking arrangement. In such an arrangement, the fan out devices and splitters can form multiple stacks in an internal tray. The tray is then stacked on top of a base that is configured to hold a plurality of splice trays for splicing a feeder cable. The system also includes an integral feeder port device that is spliced to the feeder cable and provides a plurality of outputs, effectively fanning out the feeder cable.

The inputs and outputs of the splitters and fan out devices can be in the form of connectors or adapters mounted at or within the device housings, or connectors or adapters on the ends of stubs extending from the housings. The stubs (semi-rigid) can improve density and improve connector and/or adapter access through movement of the stubs. Preferably the stubs are not so flexible that the stubs become easily tangled up with each other.

Protective covers may be provided for the overall device, the feeder cable, the fan out devices, any splices, and the splitters.

The connectors and adapters utilized in the cable distribution system can be any desired connection type, such as SC type, or LC type. MPO types may also be used. Another example is a connector and adapter system as shown in international patent publication Nos. WO2012/112344 and WO 2013/117598, the entire disclosures of which are hereby incorporated by reference. This connector and mating adapter may also be referred to as a LightPlug connector and adapter, or an LP connector and adapter, in the accompanying pages. The LightPlug connector system utilizes ferruleless connectors, with bare fiber to bare fiber connections. This connector type can be terminated to a bare fiber in the factory or in the field using a LightPlug termination tool. With respect to LightPlug connectors and adapters, some cost savings may be realized by adding the adapter at a later date when connectivity is desired. A hybrid adapter can be used to connect a ferruleless LightPlug connector to a ferruled connector, like an SC type.

Growing capacity may occur where the customer wants more splitters and point-to-point (double density) at the same location. Therefore, the number of fan out devices and splitters can be increased. Alternatively, a second box or cabinet can be mounted next to the initially installed box or cabinet; one un-used fiber bundle/tube from the feeder cable is routed to the new box or cabinet and the new box or cabinet can be installed similar to the first box. Depending on the feeder cable, more boxes or cabinets can be connected.

Growing capacity in another case can occur where the customer wants a second box at a nearby location. A second box can be mounted somewhere in the neighborhood; feeder fibers from un-used bundles/tubes are spliced to a feeder cable which runs to the second box; this spliced feeder stub enters the second box in the same way the feeder enters the first box. Depending on the feeder cable, more boxes can be connected in a daisy-chaining manner.

In one aspect of the present disclosure, a fiber distribution system is disclosed. The fiber distribution system includes a feeder cable and a base defining a breakout region. At the breakout region, a plurality of optical cables of the feeder cable can be accessed. The breakout region includes at least one splice tray. The fiber distribution system also includes at least one feeder fan out device that has a single input and a plurality of outputs. The single input of the at least one feeder fan out device is spliced with the feeder cable. The fiber distribution system further includes at least one splitter that has a single input and a plurality of outputs. The single input of the at least one splitter is a connectorized end plugged into one of the outputs of the at least one fan out device. The fiber distribution system includes at least one distribution fan out device having a plurality of inputs and a single output. The plurality of inputs are configured to receive a connection from an output of the at least one feeder fan out device or an output of the at least one splitter. The single output of the at least one distribution fan out device is spliced with a distribution cable to provide a single service output.

In another aspect of the present disclosure, a fiber distribution system is disclosed. The fiber distribution system includes a base that defines a breakout region. The breakout region includes at least one splice tray. The fiber distribution system includes at least one feeder fan out device that has at least one input and a plurality of outputs. The at least one input of the at least one feeder fan out device is connectable with a feeder cable. The fiber distribution system includes at least one distribution fan out device that has a plurality of inputs and at least one output. The plurality of inputs are configured to receive a connection from an output of the at least one feeder fan out device. The at least one output of the at least one distribution fan out device is connectable with a distribution cable to provide a single service output.

In another aspect of the present disclosure, a method of assembling a fiber distribution system is disclosed. The method includes providing a feeder cable at a breakout region of a base and splicing or otherwise connecting the feeder cable to an at least one input of an at least one feeder fan out device, the at least one feeder fan out device having a plurality of outputs. The method includes connecting an at least one input of an at least one splitter with one of the outputs of the at least one feeder fan out device. The at least one input has a connectorized end and the at least one splitter has a plurality of outputs. The method includes providing a single service output at an at least one output of an at least one distribution fan out device, the at least one distribution fan out device including a plurality of inputs. The plurality of inputs are configured to receive a connection from an output of the at least one feeder fan out device or an output of the at least one splitter.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIGS. 5 and 6 show example fan out devices of the fiber distribution system of FIG. 1;

FIG. 7 shows an example storage tower along with example splitters and fan out devices, according to one embodiment of the present disclosure;

FIGS. 11, 12, and 13 show example cable management modules of the distribution box or cabinet of FIG. 2;

DETAILED DESCRIPTION

Figure 1:
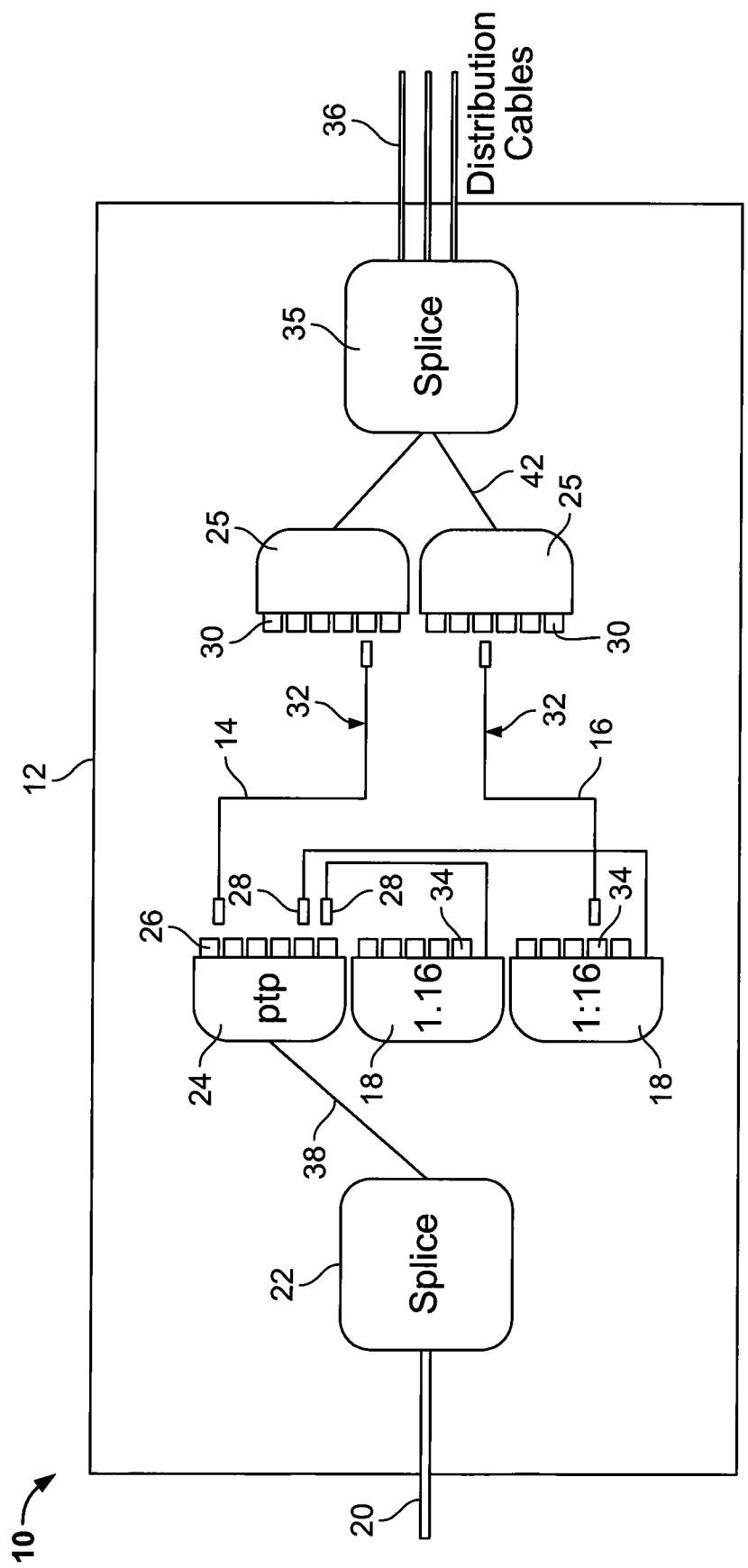
FIG. 1 shows a schematic view illustrating a fiber distribution system showing feeder fibers first spliced to a fan out device and then connected to either splitter outputs or to fan-out inputs for point-to-point outputs, according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Referring now to FIGS. 1-27, a distribution box or cabinet receives a feeder cable with one or more feeder fibers. The feeder cable is first spliced and then taken to a feeder fan out device that separates the individual optical fibers of a multi-fiber feeder cable. From the outputs of the fan out device, each fiber can then be connected to either a splitter, for a split output, or wired as a point-to-point connection to a distribution fan out device. The fibers, coming from either the splitters or feeder fan out device, can then be connected to another fan out device or to a splice, and distributed as un-connectorized distribution cables.

A variety of splitter and fan out devices are shown having housings mounted to distribution boxes or cabinets. The splitters used are for splitting of the signals of the fanned out feeder fibers. Within the interior of the splitter, the splitter input is split into a plurality of outputs. The distribution box can hold one or more splitters and fan out devices. The preferred distribution box or cabinet allows for: 1) split outputs of a splitter input cable connected at the termination field; 2) point-to-point connection with an output cable at the termination field; or 3) both split feeder signal and point-to-point feeder signals. FIG. 1 shows this schematically.

Referring further to FIG. 1, the schematic representation of a distribution system 10 includes a distribution box or cabinet 12 shown offering both point-to-point 14 and split output 16 connections for the feeder cable 20 to the service users. The feeder cable 20 is shown entering a splice 22 and then connected to a feeder fan out device 24. The feeder fan out device 24 provides a plurality of outputs 26, which can be connected to either an input 28 of a splitter 18 or an input 30 of a distribution fan out device 25 using a patch cable 32. Each patch cable 32 is connectorized at either end. At one end, each patch cable 32 either connects to an output 26 of the feeder fan out device 24 or a splitter output 34. At the other end, the patch cables 32 connect to the input 30 of the distribution fan out device 25. The distribution fan out devices 25 then output a cable that is spliced 35 to un-connectorized distribution cables 36. The un-connectorized distribution cables 36 are then routed out of the distribution box or cabinet 12 to the customer.

Figure 2:
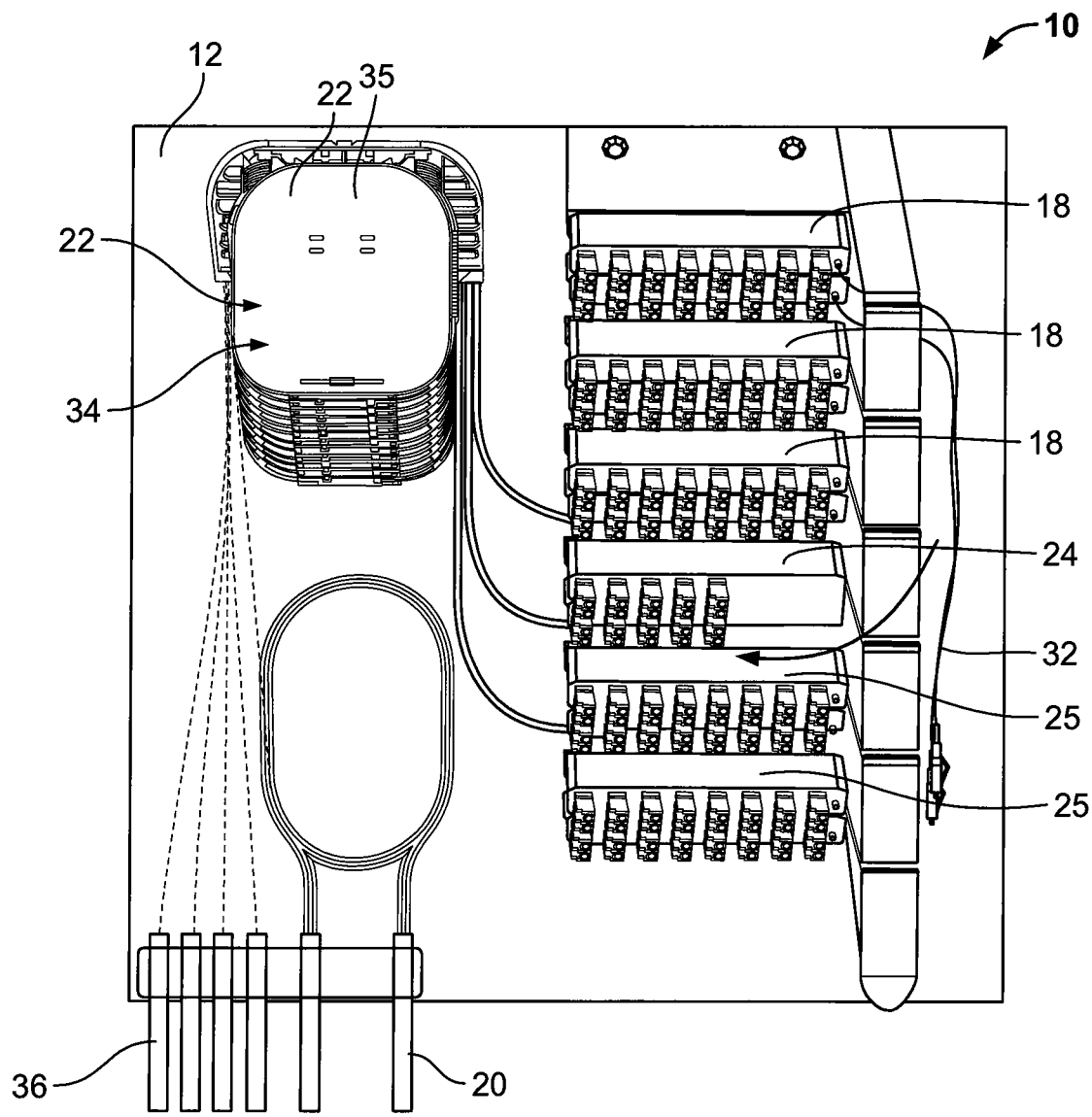
FIG. 2 shows a distribution box or cabinet of the fiber distribution system of FIG. 1.

FIG. 2 shows the system 10 in the distribution box or cabinet 12. Each component can be organized within the distribution box or cabinet 12 so as to allow the system to be customized for particular applications. This allows the user to use similar components for a variety of differently sized applications. System 10 allows for the later addition of splitters 18 and/or fan out devices 24/25 to delay early cost if the system is small to start. At a later date, if the system 10 needs to expand, splitters and fan-outs can be added.

Figure 3:
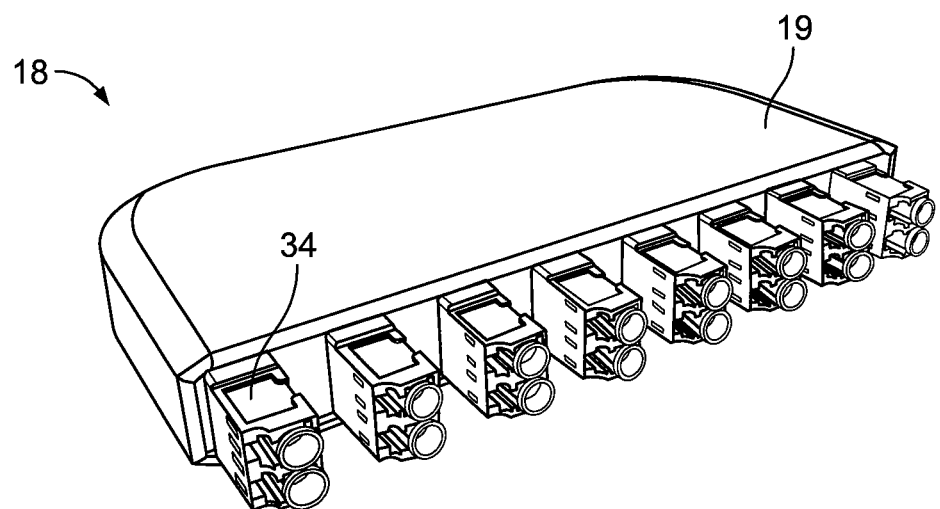
FIGS. 3 and 4 show example splitters of the fiber distribution system of FIG. 1, the splitters being 1×16 splitters.
Figure 4:
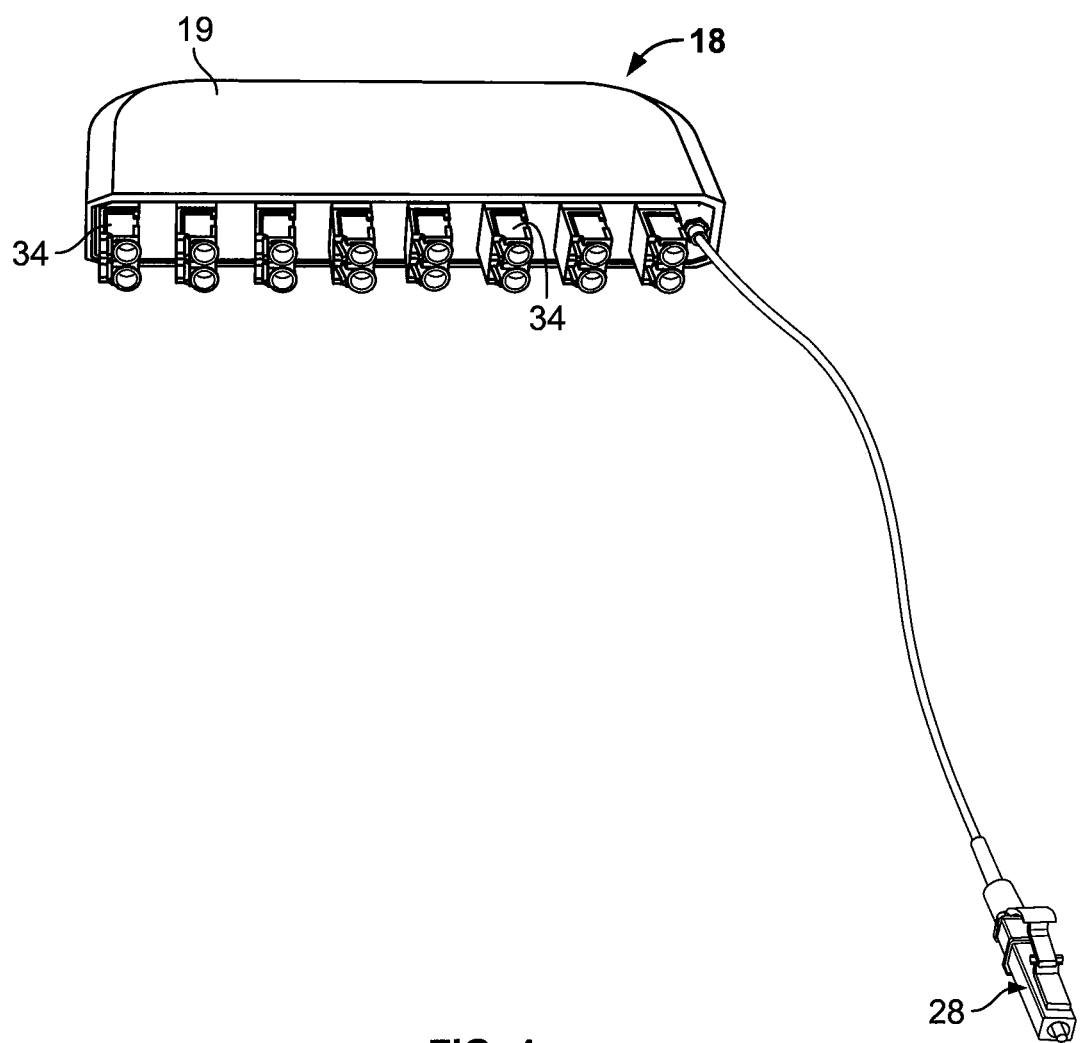

FIGS. 3 and 4 show perspective views of the splitters 18. The splitter 18 shown includes sixteen outputs 34 spaced so as to allow for the easy connecting and removal of patch cables 32. However, other sized splitters can also be used with more outputs or less outputs. The splitter outputs 34 can be SC or LC connectors, in addition to multi-fiber connectors, such as MPO connectors. The splitters can include port identifiers, a splitter identifier, and an RFID tag, if desired. The splitter inputs 28 are connected to the outputs 26 of the fan out device 24, which is where the feeder cable 20 is spliced. The splitter 18 takes the feeder cables and splits them into splitter outputs. The splitter outputs 34 are shown as fiber optic connectors disposed within the housings of each splitter 18. The patch cable 32 is connectorized with a mating connector and a mating adapter for connecting to the splitter outputs 34 within the inputs 30 of the distribution fan out devices 25. Each splitter 18 has a housing 19 that is configured to allow the splitter 18 to fit within the distribution box or cabinet 12.

FIG. 5 shows the feeder fan out device 24. The feeder fan out device 24 receives an input cable 38 from the splice 22. The feeder fan out device 24 operates to separate the individual optical fibers of a multi-fiber feeder cable 20 in a manner such that the fibers are not damaged so as to maintain a quality transmission link. As shown, the feeder fan out device outputs 26 are shown as fiber optic connectors disposed within housings 40 of each fan out device 24. The feeder fan out device 24 includes twenty-four outputs 26 spaced so as to allow for the easy connecting and removal of patch cables 32. However, the fan out device 24 can be configured with more or less outputs. The outputs 26 can be SC or LC connectors, in addition to multi-fiber connectors, such as MPO connectors. The feeder fan out device 24 can include port identifiers, a splitter identifier, and an RFID tag, if desired. The patch cable 32 is connectorized with a mating connector and a mating adapter for connecting to the fan out device outputs 26 within the splitter inputs 28 (split signal) or the inputs 30 of the distribution fan out devices 25 (point-to-point connector). Each fan out device 24 has a housing 40 that is substantially similar to the housing of the splitter 18. The housings 40 are configured to allow the fan out device 24 to fit within the distribution box or cabinet 12.

FIG. 6 shows the distribution fan out device 25. The distribution fan out device 25 receives a plurality of inputs 30 and outputs to a cable 42 that is routed to the splice 35. The distribution fan out device 25 is similar to the feeder fan out device 24, except that it operates in an opposite manner. The distribution fan out device 25 includes thirty-two inputs 30 spaced so as to allow for the easy connecting and removal of patch cables 32. However, the distribution fan out device 25 can be configured with more or less outputs. The inputs 30 can be SC or LC connectors, in addition to multi-fiber connectors, such as MPO connectors. The distribution fan out device 25 can include port identifiers, a splitter identifier, and an RFID tag, if desired. The distribution fan out device 25 also includes a housing 44 that is substantially similar to the housing 19 of the splitter 18 and the housing 40 of the feeder fan out device 24.

FIG. 7 shows a schematic illustration of a portion of the system 10. A tower 46 is shown that is configured to fit within the distribution box or cabinet 12. As shown, the tower 46 includes six slots 48. Each slot 48 is configured to receive and secure either a fan out device 24/25 or a pair of splitters 18. In other embodiments, the tower 46 can be configured to include more or less slots 48. Additionally, each slot 48 can be sized differently to include a plurality of different fan out/splitter arrangements. For example, each slot 48 can be configured to hold a pair of fan out devices 24/25. The tower 46 can also be loaded with components as needed, and then expanded or shrunk after installation to meet the needs of the application. In some embodiments, the tower 46 can be modular, and individual slots 48 can be added or removed as needed.

Figure 8:
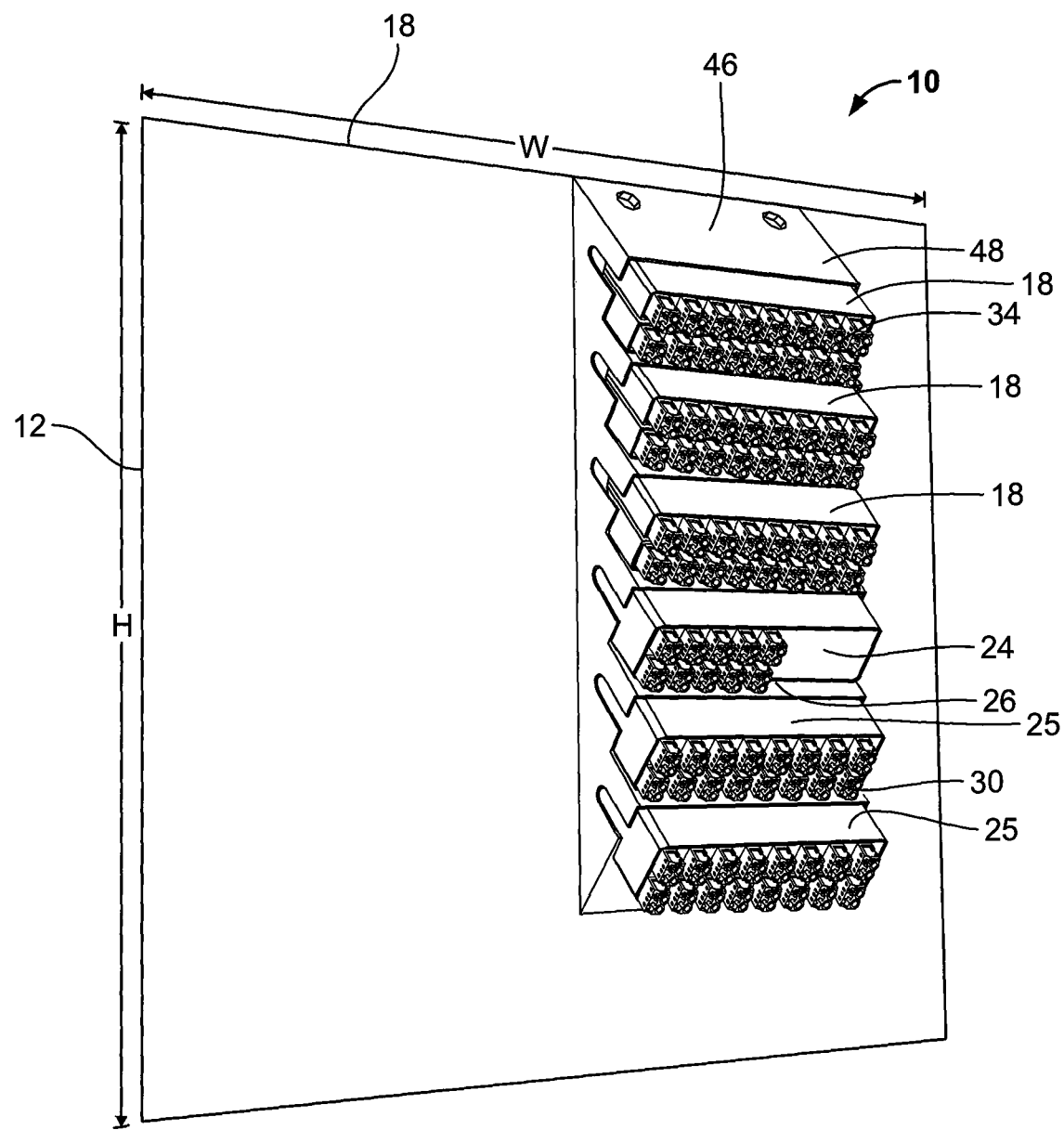
FIG. 8 shows the example tower of FIG. 7 mounted to a base of the distribution box or cabinet.

FIG. 8 shows the tower 46 with fan out devices 24/25 and splitters 18 installed in the slots 48. As shown, the feeder fan out device 24 includes twenty-four outputs 26. Six splitters 18 are shown installed in three slots. Each splitter includes sixteen outputs 34. Further, each of the pair of distribution fan out devices 25 includes thirty-two inputs 30. As shown, the tower 46 is mounted to the box or cabinet 12. In some embodiments, the box or cabinet 12 has a width W of about 500 mm and a height H of about 500 mm.

Figure 9:
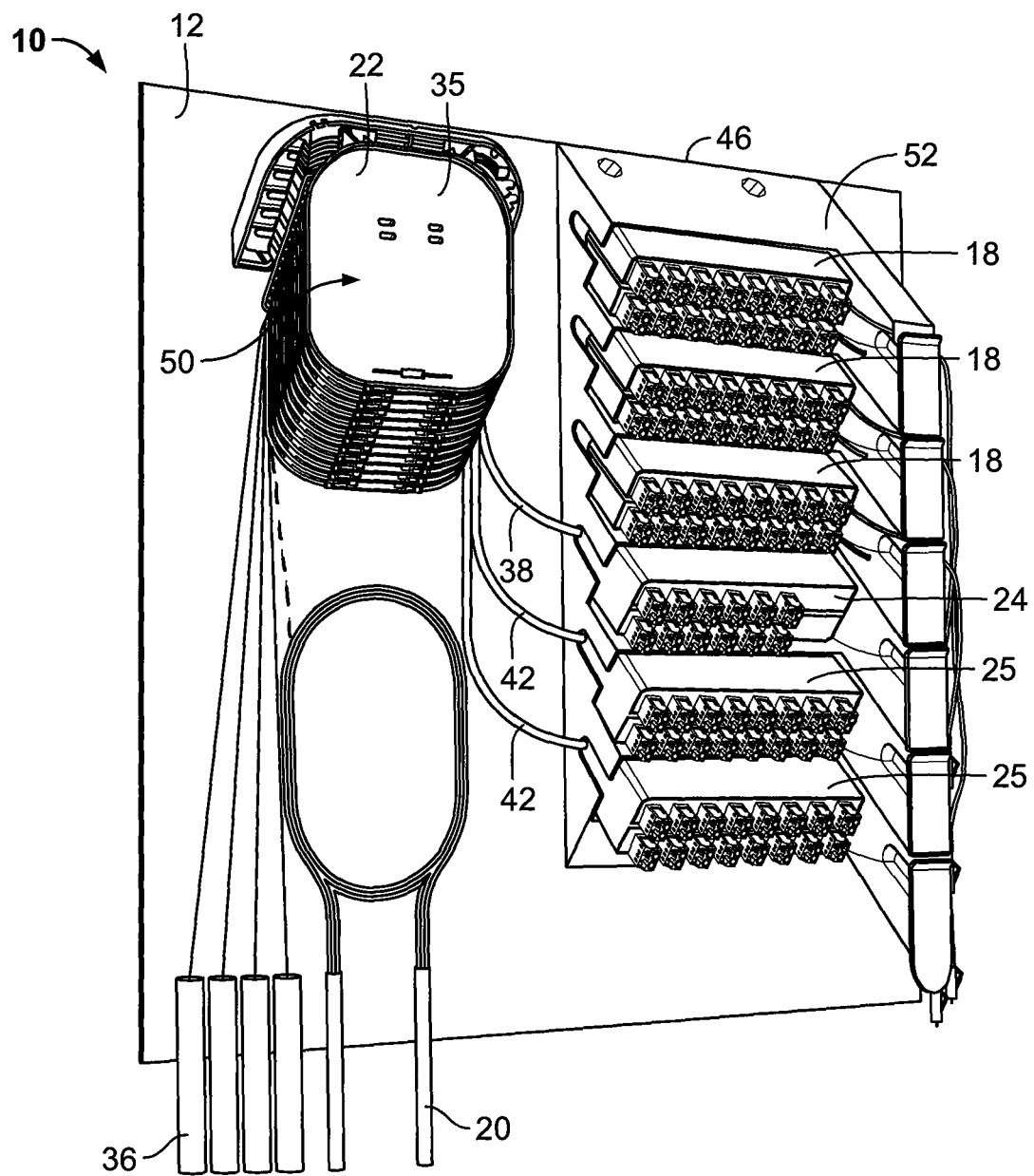
FIGS. 9 and 10 show the distribution box or cabinet of FIG. 2, including cable management modules of the fiber distribution system.
Figure 10:
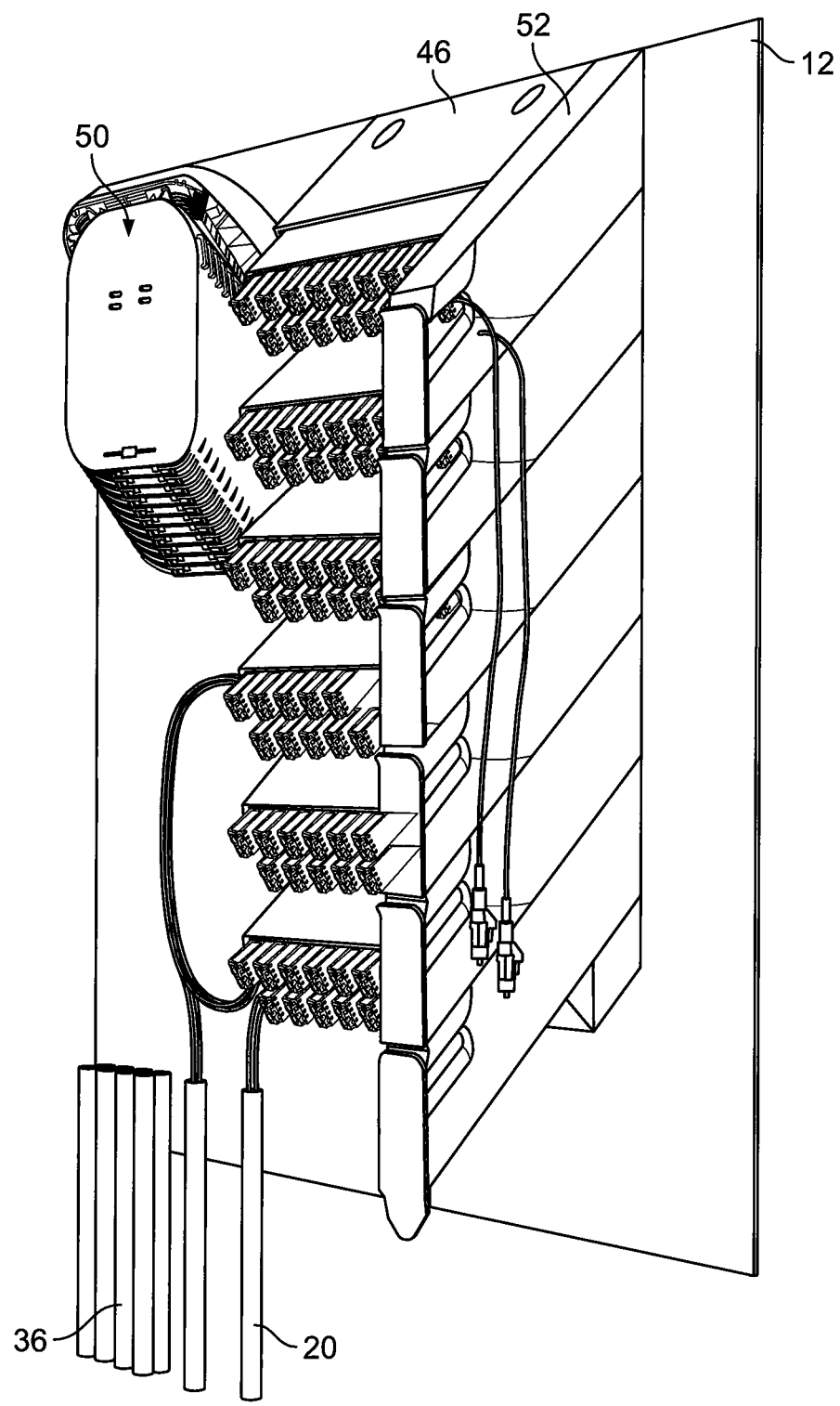
Figure 15:
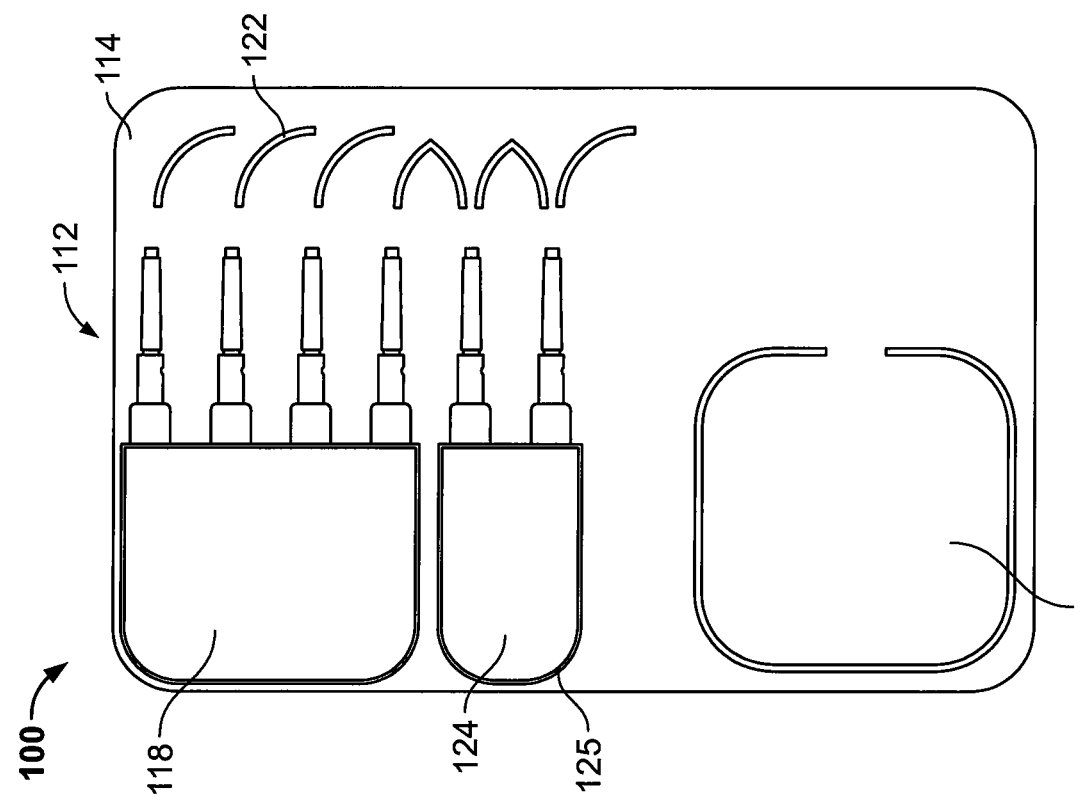
FIG. 14 and FIG. 15 show a distribution box or cabinet of a fiber distribution system, according to one embodiment of the present disclosure.

FIGS. 9 and 10 show the system 10 assembled in the distribution box or cabinet 12. As shown on one side of the distribution box or cabinet 12, the splices 22, 35 are positioned in a splice tower 50. The splice tower 50 can include a plurality of splice trays. In the depicted embodiment, the splice tower 50 includes twelve splice trays. Also shown near the splice tower 50 are the distribution cables 36 that are un-connectorized. By using un-connectorized distribution cables 36, it allows the user flexibility and cost savings as there is no need to connectorize the distribution cables 36 in the field.

The tower 46 is positioned on the opposite side of the distribution box or cabinet 12. Adjacent the tower 46 is a vertical stack of cable management modules 52. The modules 52 create a vertical trough 53 so as to organize cabling (such as patch cables 32) connecting the fan out devices 24/25 with the splitters 18.

FIGS. 11-13 show the modules 52. In some embodiments, the modules 52 are positioned adjacent the tower 46. As shown in FIG. 11, each module 52 includes a cable spool 54, a cable arm 56, and a wall portion 58. FIGS. 12-13 show a pair of modules 52 stacked on top of one another adjacent two slots 48 of the tower 46. In some embodiments, the module 52 can also be connected to a single slot 48, thereby forming a tower module with cable management. Multiple tower modules can be assembled to create a tower with an integrated cable management solution. Alternatively, the modules 52 can be stacked adjacent a separately fabricated tower 46 to create a similar solution.

The modules 52 are configured to first allow cables to pass through and over the cable arm 56. The cable arm 56 supports cabling passing therethrough, and keeps the cabling from sagging. Once passed through the cable arm 56, the spool 54 of each module 52 is configured to house any slack left in the cables. The cables can then be routed in the vertical trough 53 so as to allow cabling to travel to other components of the system 10. For instance, a patch cable 32 can be routed from a splitter 18 to a fan out device 24/25 by traveling from the splitter 18, to the vertical trough 53, and then back over to the fan out device 24/25. The modules 52 allow the front of the tower 46 to stay free of excess cabling. This allows the user to quickly and easily find connectors on the splitters 18 and the fan out devices 24/25 during service and installation.

Figure 14:
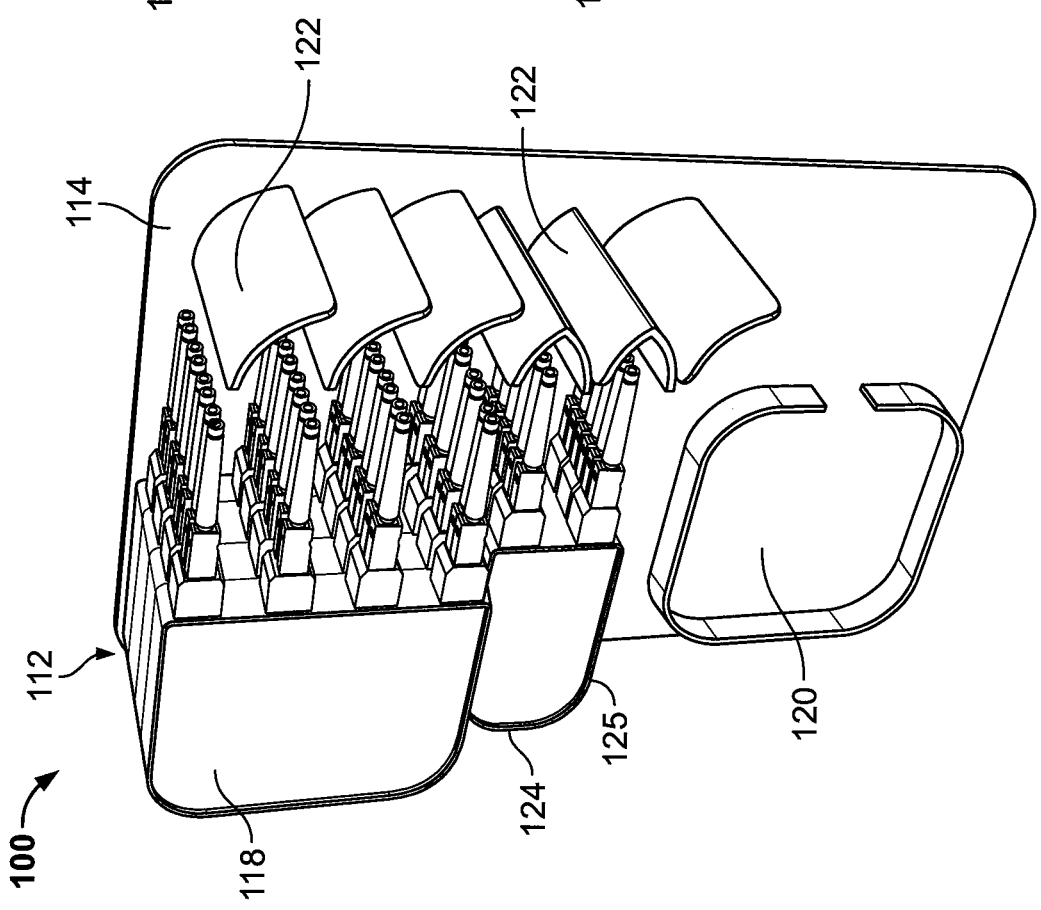

FIG. 14 shows a distribution system 100 mounted in a distribution box or cabinet 112 according to another embodiment of the present disclosure. The system 100 includes similar components of the system 10, but positioned slightly differently. Further, the system 100 can operate in a similar manner as the system 10 above. The system 100 is configured to receive a feeder cable (not shown) and splice the feeder cable to at least one fan out device 124. The fan out device 124 is then connected to either a splitter 118 (for a split signal) or directly to a distribution fan out device 125 (for a point-to-point connection). Finally, un-connectorized distribution cables (not shown) are output from the system 100. As shown, the distribution box or cabinet 112 includes a base 114. Mounted to the base 114 are a plurality of splitters 118 and a plurality of fan out devices 124/125. The base 114 also includes one or more storage areas 120. The storage area 120 can be used for cable slack, unused feeder cables or for splice tray storage. Further, the system 100 includes cable guides 122, so as to help guide and organize cabling within the system traveling from the fan out devices 124 to the splitters 118.

Figure 17:
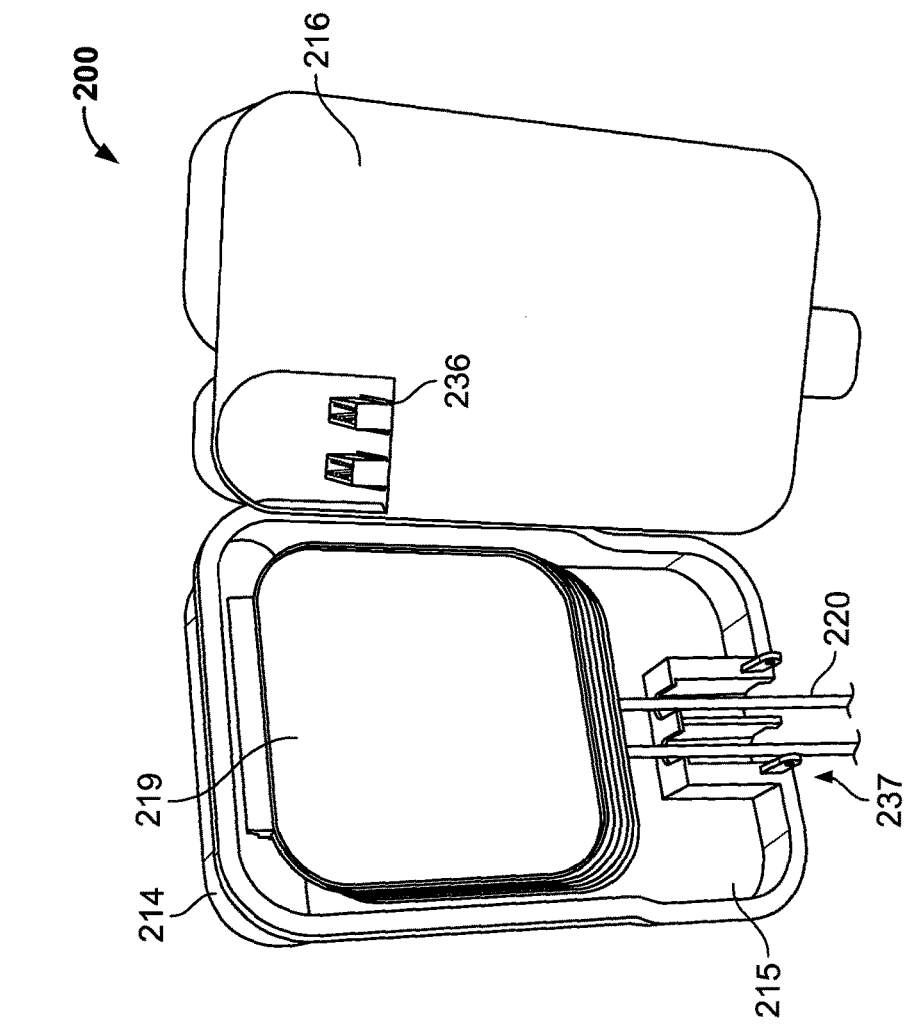
FIG. 16 and FIG. 17 show a distribution box or cabinet of a fiber distribution system that utilizes a stacked arrangement, according to one embodiment of the present disclosure.
Figure 16:
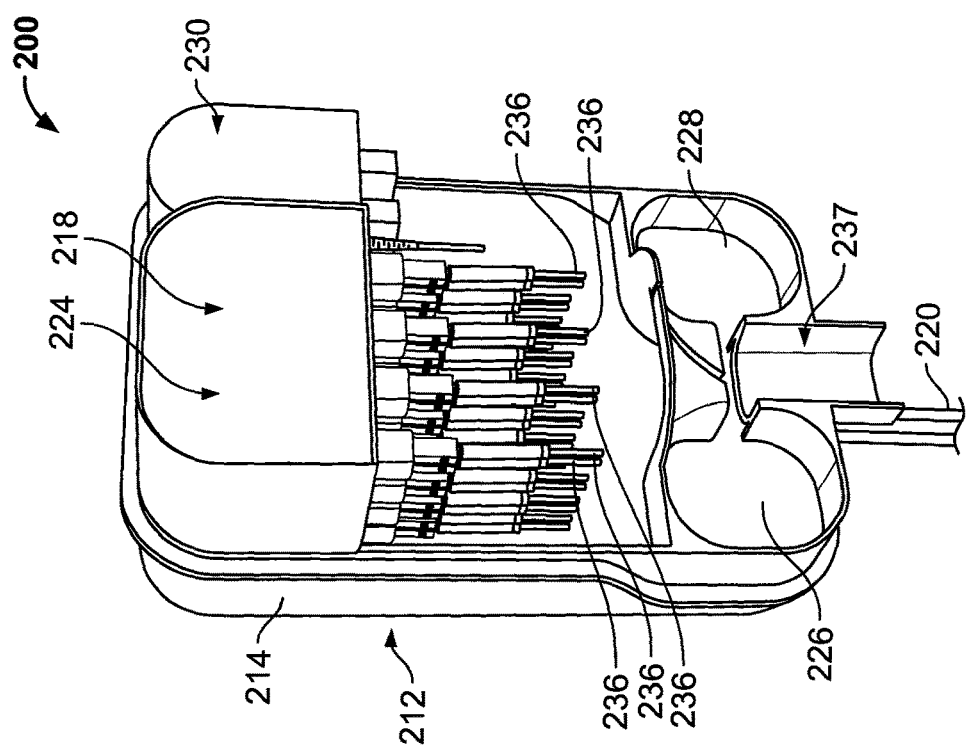

Referring now to FIGS. 16 and 17, an alternative system 200 with a distribution box or cabinet 212 is shown. The system 200 includes similar components of the system 10 and 100, but is orientated slightly differently. The distribution box or cabinet 212 can include a cover (not shown), a base 214, and an internal cover 216 used for cable routing and storage. The base 214 includes a storage area 215 to hold and house a plurality of splice trays 219. Feeder cables 220 pass through a channel 237 and enter the splice trays 219. The internal cover 216 is positioned over the splice and storage area 215 of the base 214. In some embodiments, the internal cover 216 can be hinged to base 214. In other embodiments, tabs and snaps are used to mount the internal cover 216 to the base 214. The internal cover 216 can include an area to store a plurality of fan out devices 224 and/or splitters 218. Further, the internal cover 216 includes one or more storage areas 226, 228. The left side storage area 226 can be used to store dark fibers or unused fibers. The right side storage area 228 can be used to store active fibers. Both the left and right sides 226, 228 can be used to store splice holders.

The spliced feeder cables 220 can enter the internal cover 216 through feeder ports 230. From the feeder ports 230, cables can travel to a fan out device 224. From the fan out device 224, cables can then travel to either a splitter 218, which can be stacked with the fan out device 224, or cables can be output to the customer in the form of a distribution cable 236 for a point-to-point connection. If the cables travel to a splitter 218, the signal is then split and the multiple distribution cables 236 can be connected to the outputs of the splitter to achieve a split signal to multiple customers.

In other embodiments, the feeder ports 230 can instead function as fan out devices 224. In such an embodiment, the fan out devices 224 are positioned adjacent the stack of splitters 218 within the distribution box or cabinet 212. From the fan out device 224, cables can then be run either to the splitters 218 for a split signal output, or cables can run directly out of the box of cabinet 212 through the channel 237 in the form of distribution cables 236.

Figure 18:
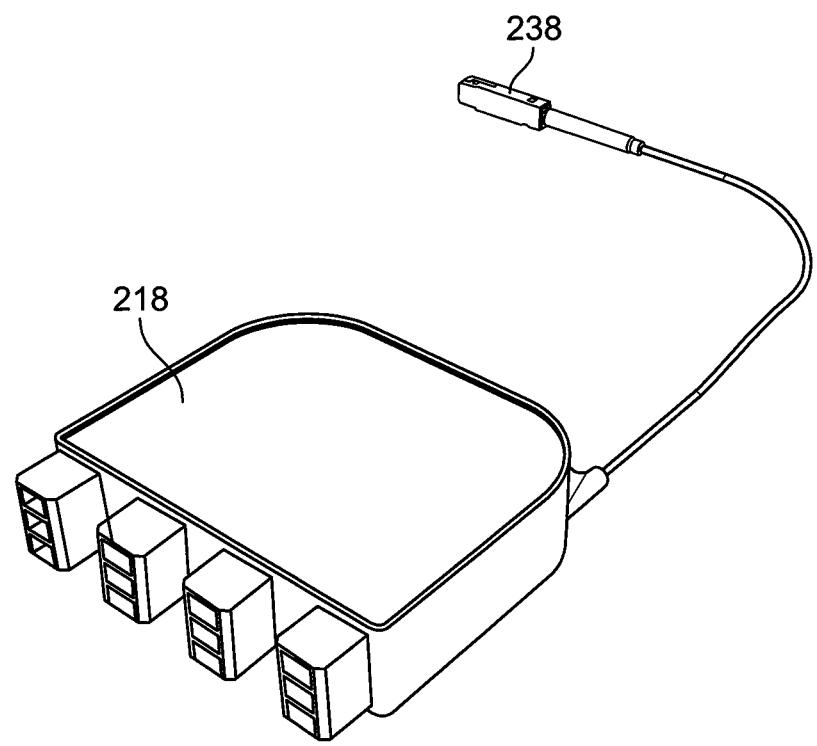
FIG. 18 shows an example splitter of the fiber distribution system of FIGS. 16 and 17, the splitter being a 1×8 splitter.
Figure 19:
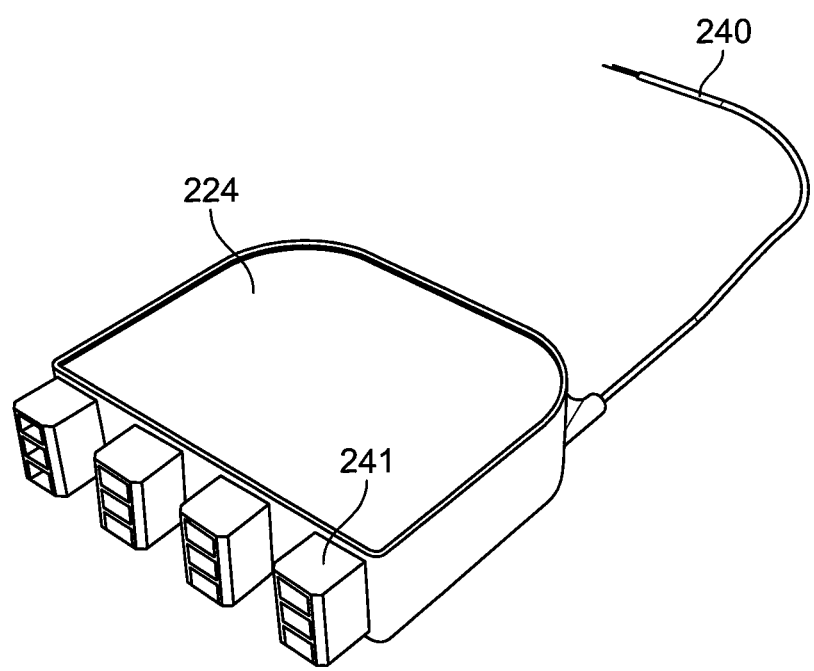
FIG. 19 shows an example fan out device of the fiber distribution system of FIGS. 16 and 17, the fan out device including twelve outputs.
Figure 21:
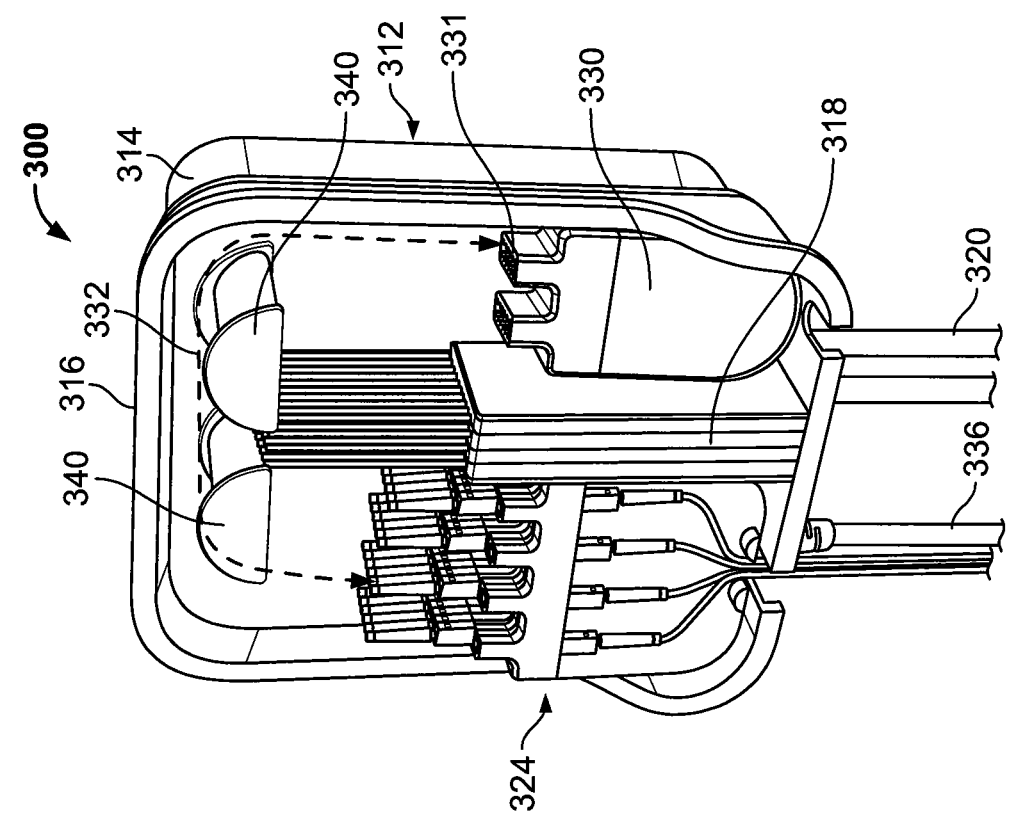
FIG. 20 and FIG. 21 show a distribution box or cabinet of a fiber distribution system according to one embodiment of the present disclosure, the system utilizing a stacked arrangement and being configured for use with pre-connectorized distribution cables.
Figure 20:
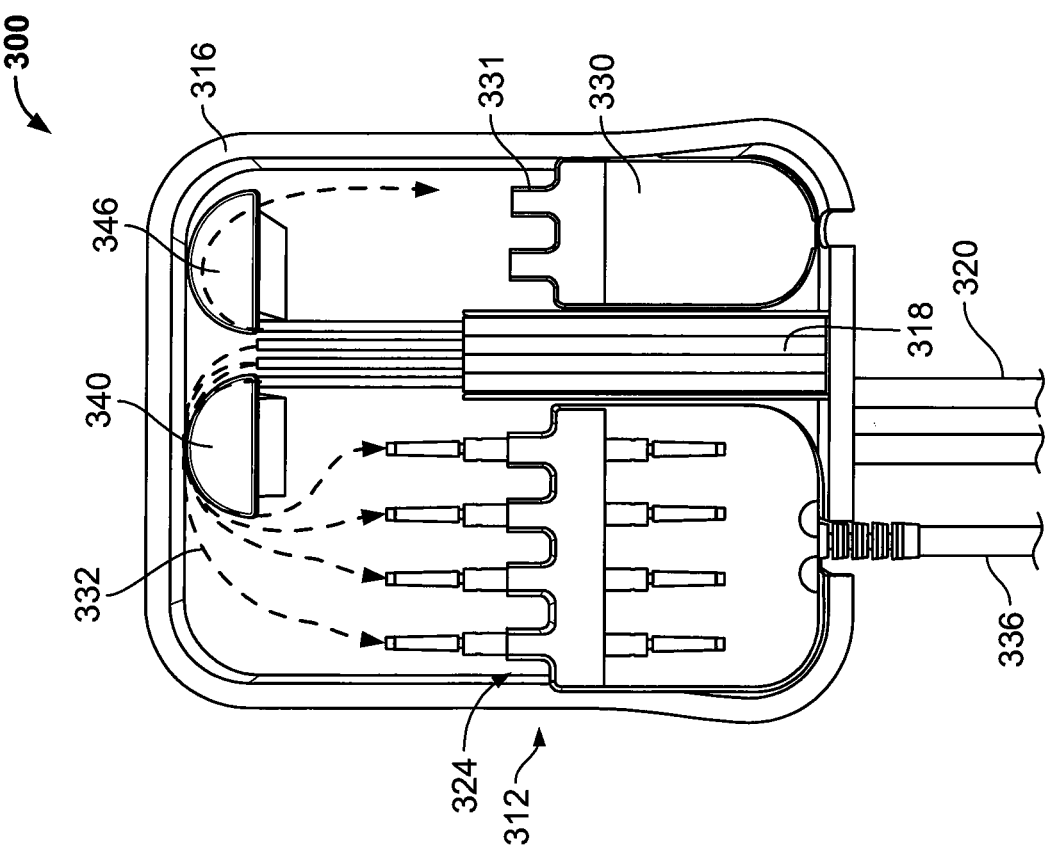

FIGS. 18 and 19 show an example splitter 218 and an example fan out device 224. As shown, the splitter 218 is has a connectorized input 238. The input 238 is configured to connect with the output 241 of the fan out device 224. In FIG. 19, an input 240 of the fan out device 224 is shown to be non-connectorized and is configured to be spliced with feeder cable 220 at the splice trays 219. The splitter 218 and fan out device 224 can be of a variety of different size for a variety of different applications. In some embodiments, the splitter 218 and the fan out device 224 are stackable on top of one another. In other embodiments, the splitter 218 and fan out device 224 are configured to be placed side-by-side within the box or cabinet 212. The splitter and fan out inputs and outputs can be SC or LC connectors, in addition to multi-fiber connectors, such as MPO connectors. The splitters 218 and fan out devices 224 can include port identifiers, a splitter identifier, and an RFID tag, if desired.

FIGS. 20-24 show an alternative system 300 with a distribution box or cabinet 312. The system 300 includes similar components of the systems 10, 100, and 200; however, the system 300 is configured to be used with pre-connectorized distribution cables 336. The distribution box or cabinet 312 can include a cover (not shown), a base 314, and an internal cover 316. The base 314 includes a storage area 315 to hold and house a plurality of splice trays 319. Feeder cables 320 enter into the base 314 and are spliced at a plurality of splice trays 319. The internal cover 316 is positioned over the splice and storage area of the base 314. In some embodiments, tabs and snaps are used to mount the internal cover 316 to the base 314. The internal cover 316 can include an area to store a plurality of fan out devices 324, splitters 318, and feeder port devices 330.

In the depicted embodiment, the system 300 receives the feeder cables 320 at the base 314 of the box or cabinet 312. The cables 320 are then spliced with an input 333 of at least one feeder port device 330. The feeder port devices 330 can operate as a fan out device, thereby separating the individual fibers of the feeder cable 320 and providing an output connector 331 for each fiber of the feeder cables 320.

From the outputs 331 of the feeder port devices 330, patch cables 332 can connect to either to an input of one splitter 318 or connect to a fan out device 324. Additional splitters 318, fan out devices 324, and feeder port devices 330 can be added at a later date after the initial installation, as desired.

This helps defer costs. If connected to the splitter 318, a split signal will be produced, and the output of the splitter 318 will be connected to the input of the fan out device 324 and will exit out of the distribution box or cabinet 312 as a multi-fiber distribution cable 336, similar to the system 10. This connection example is shown by the dotted lines in FIG. 20. Alternatively, if the patch cables 332 connect the outputs 331 of the feeder port devices 330 to the fan out device 324, a point-to-point connection is made. This connection example is shown by the dotted lines in FIG. 21. Further, the box or cabinet 312 also includes cable management devices 340 to help to manage the patch cables 332 within the interior of the box or cabinet 312.

Figure 22:
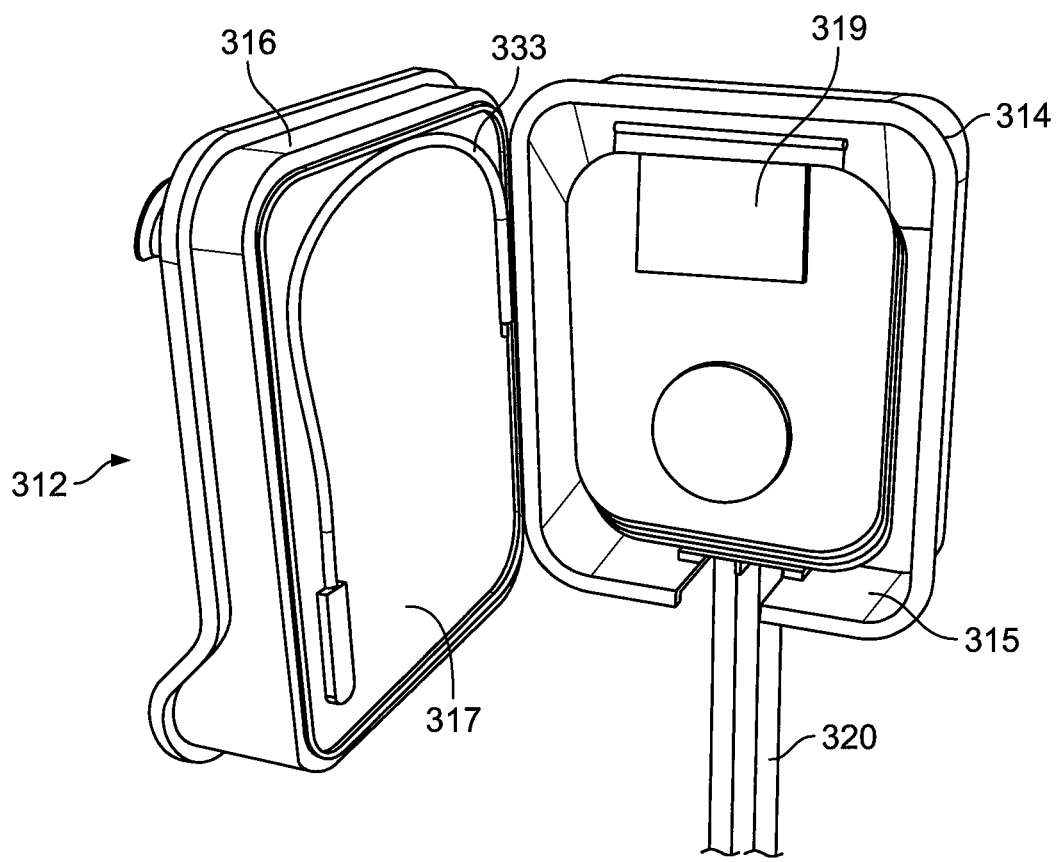
FIG. 22 shows the distribution box or cabinet of FIGS. 20 and 21 with an internal cover removed from a base.
Figure 23:
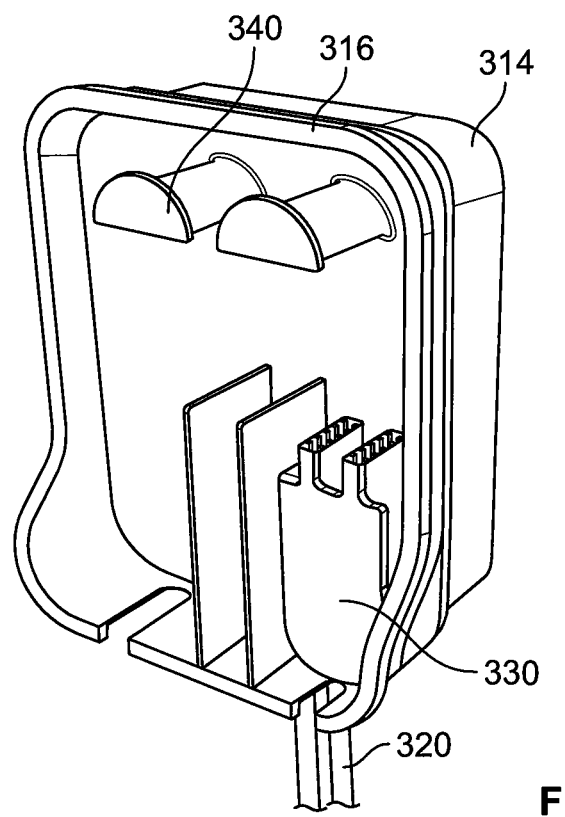
FIG. 23 shows the distribution box or cabinet of FIGS. 20 and 21 with an internal cover installed on the base.

FIG. 22 shows the distribution box or cabinet 312 with the internal cover 316 partially removed from the base 314. FIG. 23 shows the distribution box or cabinet 312 with the internal cover 316 covering the base 314. As shown, at least one feeder port device 330 is pre-installed in the internal cover 316. The input 333 of the feeder port device 330 is shown to be positioned at back side 317 of the internal cover 316, and positioned to be spliced with the feeder cables 320 at the splice tray 319.

Figures 24, 25:
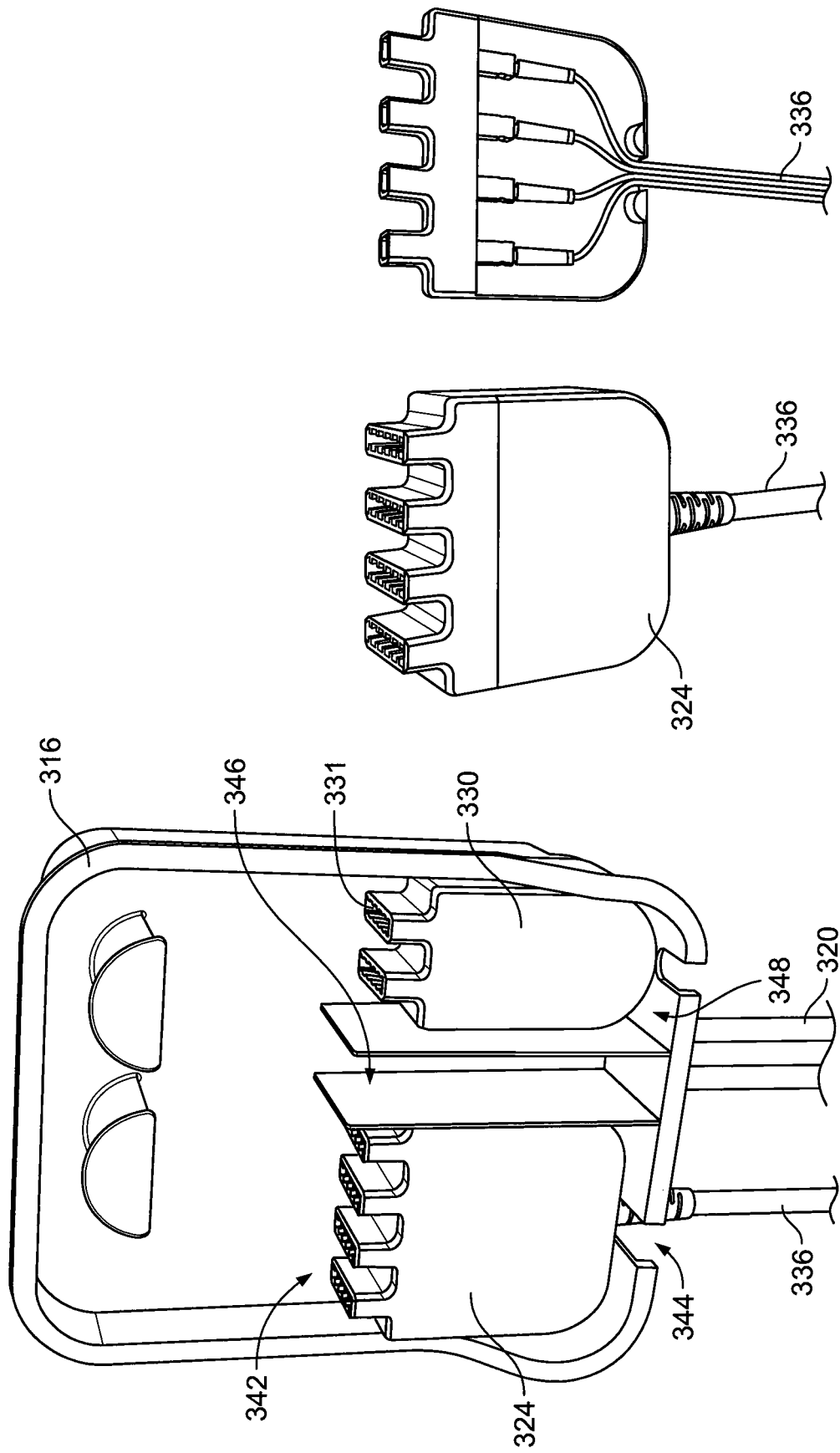
FIG. 24 shows the internal cover of the distribution box or cabinet of FIGS. 20 and 21.
FIG. 25 shows example fan out devices of the fiber distribution system of FIGS. 20 and 21.

FIG. 23 shows the internal cover 316. The internal cover 316 can have a plurality of storage areas. In one area 342, a plurality of fan out devices 324 can be stored. Additionally, the storage area 342 can also include an exit slot 344 for the distribution cables 336. As shown in FIG. 25, the distribution cables 336 are pre-connectorized with fan out devices 324. The fan out devices 324 can be slid into the box 312 while the cable 336 exits the box 312 through the exit slot 344.

A second storage area 346 can be used to store a plurality of splitters 318, and a third storage area 348 is used to store a plurality of feeder port devices 330.

Figure 27:
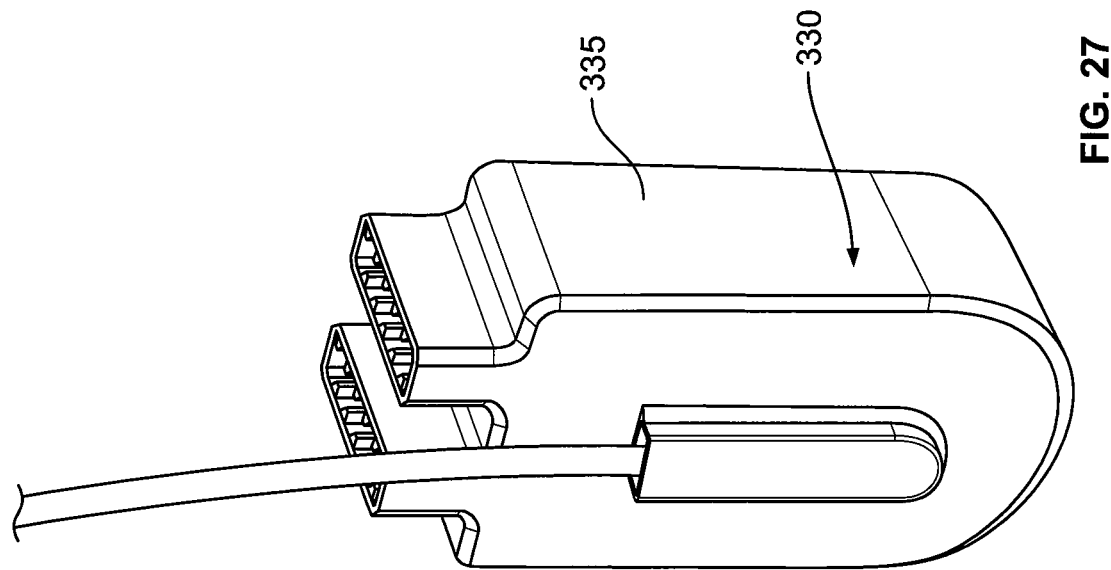
FIGS. 26 and 27 show example feeder port devices of the fiber distribution system of FIGS. 20 and 21.
Figure 26:
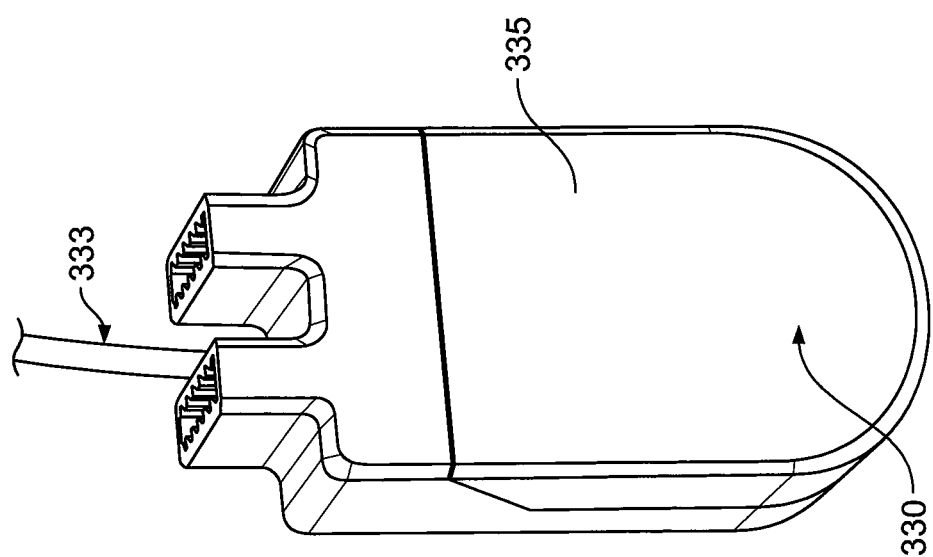

FIGS. 26 and 27 show the feeder port device 330 of the system 300. As shown, the input 333 enters a backside of a housing 335 of the feeder port device 330.

In some embodiments, a second box substantially similar to box 312 can be mounted somewhere in the neighborhood, near box 312. Unused feeder-fibers can be spliced back into a feeder cable and run to the second box. The second box can operate identical to the box 312. Depending on the feeder cable, more boxes can be connected in a daisy-chaining manner.

As noted, various implementations of the systems 10, 100, 200, 300 are provided for adding capacity over time. One implementation is to add the splitters or fan out devices as needed over time. Another implementation for adding capacity uses two distribution boxes. Splitters from the second distribution box can be connected to point-to-point connections of the first distribution box. Another implementation for adding capacity includes a feeder cable connected to two (or more) distribution boxes as desired. This provides additional feeder connections to customers directly, or through splitters. Another implementation for increasing capacity includes adding a second (or more) distribution box at a remote location, wherein a further feeder cable is spliced to the first feeder cable to link the two distribution boxes. Another implementation in systems 200 and 300 is to add a new additional internal cover 216, 316 to the distribution box or cabinet 212, 312 to add increased outputs through the use of larger splitters.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

We claim:

1. A fiber distribution system comprising:
   a system housing including a base;
   a feeder cable;
   the base defining a breakout region at which a plurality of optical cables of the feeder cable can be accessed, the breakout region including at least one splice tray;
   at least one feeder fan out device including a feeder fan out device housing mounted to the system housing, the at least one feeder fan out device further including at least one input and a plurality of outputs, the plurality of outputs being at least one of connectors or adapters mounted in the feeder fanout device housing of the at least one feeder fan out device, the at least one input of the at least one feeder fan out device being spliced or otherwise connected with the feeder cable;
   at least one splitter including a splitter housing mounted to the system housing, the at least one splitter further including at least one input and a plurality of outputs, the plurality of outputs being at least one of connectors or adapters mounted in the splitter housing of the at least one splitter, wherein the at least one input of the at least one splitter includes a connectorized end plugged into one of the outputs of the at least one feeder fan out device; and
   at least one distribution fan out device including a distribution fan out device housing mounted to the system housing, the at least one distribution fan out device further including a plurality of inputs and at least one output, the plurality of inputs being at least one of connectors or adapters mounted in the distribution fan out device housing of the at least one distribution fan out device, wherein the plurality of inputs are configured to receive a connection directly from an output of the at least one feeder fan out device or an output of the at least one splitter, and wherein the at least one output of the at least one distribution fan out device is spliced or otherwise connected with a distribution cable to provide a single service output.

2. The fiber distribution system of claim 1, wherein the base includes a modular tower having a plurality of slots, the slots being configured to receive the at least one feeder fan out device, the at least one splitter, and the at least one distribution fan out device.

3. The fiber distribution system of claim 2, wherein the base also includes cable management modules positioned adjacent the tower, each cable management module including a spool and a cable arm configured to hold cables horizontally, and wherein a plurality of cable management modules define a vertical trough for vertical cable management.

4. The fiber distribution system of claim 1, wherein the system housing includes a permanently mounted cabinet.

5. The fiber distribution system of claim 1, wherein the system housing includes a fiber distribution box.

6. The fiber distribution system of claim 1, wherein the at least one feeder fan out device, the at least one splitter, and the at least one distribution fan out device are positioned with one another at a first storage area of the system, and wherein the feeder cable, the distribution cable, and general cable storage are positioned at a second storage area of the system.

7. The fiber distribution system of claim 6, wherein the first storage area is positioned side by side next to the second storage area.

8. The fiber distribution system of claim 6, wherein the system housing includes an internal cover configured to cover the base, wherein the first storage area is in the internal cover, and wherein the second storage area is in the base.

9. The fiber distribution system of claim 8, wherein the internal cover is connected by a hinge to the base.

10. The fiber distribution system of claim 8, wherein the at least one splitter is positioned adjacent to the at least one distribution fan out device and at least one feeder fan out device in the first storage area.

11. A fiber distribution system comprising:
a system housing including a base defining a breakout region, the breakout region including at least one splice tray;
at least one feeder fan out device having at least one input and a plurality of outputs, the at least one input of the at least one feeder fan out device being connectable with a feeder cable, the plurality of outputs of the at least one feeder fan out device being at least one of connectors or adapters; and
at least one distribution fan out device including a distribution fan out device housing mounted to the system housing, the at least one distribution fan out device further including a plurality of inputs and at least one output, the plurality of inputs being at least one of connectors or adapters mounted in the distribution fan out device housing of the at least one distribution fan out device, wherein the plurality of inputs are configured to receive a connection directly from an output of the at least one feeder fan out device, and wherein the at least one output of the at least one distribution fan out device is connectable with a distribution cable to provide a single service output.

12. The fiber distribution system of claim 11, wherein the base includes a modular tower having a plurality of slots, the slots being configured to receive the at least one feeder fan out device and the at least one distribution fan out device.

13. The fiber distribution system of claim 12, wherein the base also includes cable management modules positioned adjacent the tower, each cable management module including a spool and a cable arm configured to hold cables horizontally, and wherein a plurality of cable management modules defines a vertical trough for vertical cable management.

14. The fiber distribution system of claim 11, wherein the system housing includes a permanently mounted cabinet.

15. The fiber distribution system of claim 11, wherein the system housing includes a fiber distribution box.

16. The fiber distribution system of claim 11, wherein the at least one feeder fan out device and the at least one distribution fan out device are positioned with one another at a first storage area of the system, and wherein the system includes a second storage area for general cable storage.

17. The fiber distribution system of claim 16, wherein the first storage area is positioned side by side next to the second storage area.

18. The fiber distribution system of claim 16, wherein the system housing includes an internal cover configured to cover the base, wherein the first storage area is in the internal cover, and wherein the second storage area is in the base.

19. The fiber distribution system of claim 11, further comprising at least one splitter having at least one input and a plurality of outputs, wherein the at least one input of the at least one splitter includes a connectorized end plugged into one of the outputs of the at least one feeder fan out device and wherein the plurality of inputs of the distribution fan out device are configured to receive a connection from the output of the at least one feeder fan out device or an output of the at least one splitter.

20. A method of assembling a fiber distribution system comprising:
providing a feeder cable at a breakout region of a base of a system housing;
splicing or otherwise connecting the feeder cable to an at least one input of an at least one feeder fan out device, the at least one feeder fan out device including a feeder fan out device housing mounted to the system housing and having a plurality of outputs, the plurality of outputs being at least one of connectors or adapters mounted in the feeder fan out device housing of the at least one feeder fan out device;
connecting an at least one input of an at least one splitter with one of the plurality of outputs of the at least one feeder fan out device, the at least one splitter including a splitter housing mounted to the system housing, the at least one input of the at least one splitter having a connectorized end and the at least one splitter having a plurality of outputs, the plurality of outputs of the at least one splitter being at least one of connectors or adapters mounted in the splitter housing of the at least one splitter; and
providing a single service output at an at least one output of an at least one distribution fan out device, the at least one distribution fan out device including a distribution fan out device housing mounted to the system housing, wherein the at least one distribution fan out device includes a plurality of inputs, the plurality of inputs being at least one of connectors or adapters mounted in the distribution fan out device housing of the at least one distribution fan out device, wherein the plurality of inputs are configured to receive a connection directly from an output of the at least one feeder fan out device or an output of the at least one splitter.

21. The method of claim 20, further comprising splicing or otherwise connecting the at least one output of the at least one distribution fan out device with a distribution cable to provide the single service output.

\* \* \* \* \*